(12) United States Patent
Ramasubramonian et al.

(10) Patent No.: US 9,332,255 B2
(45) Date of Patent: May 3, 2016

(54) SIGNALING LONG-TERM REFERENCE PICTURES FOR VIDEO CODING

(71) Applicant: QUALCOMM Incorporated, San Diego, CA (US)

(72) Inventors: Adarsh Krishnan Ramasubramonian, San Diego, CA (US); Ye-Kui Wang, San Diego, CA (US); Rajan Laxman Joshi, San Diego, CA (US); Ying Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 355 days.

(21) Appl. No.: 13/924,016

(22) Filed: Jun. 21, 2013

(65) Prior Publication Data

US 2014/0003538 A1 Jan. 2, 2014

Related U.S. Application Data

(60) Provisional application No. 61/665,784, filed on Jun. 28, 2012.

(51) Int. Cl.
| | | |
|---|---|---|
| H04N 19/00 | (2014.01) | |
| H04N 19/196 | (2014.01) | |
| H04N 19/44 | (2014.01) | |
| H04N 19/58 | (2014.01) | |
| H04N 19/70 | (2014.01) | |
| H04N 19/463 | (2014.01) | |
| H04N 19/573 | (2014.01) | |

(52) U.S. Cl.
CPC ....... *H04N 19/00533* (2013.01); *H04N 19/196* (2014.11); *H04N 19/44* (2014.11); *H04N 19/463* (2014.11); *H04N 19/573* (2014.11); *H04N 19/58* (2014.11); *H04N 19/70* (2014.11)

(58) Field of Classification Search
None
See application file for complete search history.

(56) References Cited

U.S. PATENT DOCUMENTS

| | | | | |
|---|---|---|---|---|
| 8,494,049 B2 * | 7/2013 | Buttimer et al. | ......... | 375/240.12 |
| 2002/0092030 A1 | 7/2002 | Gu | | |

(Continued)

FOREIGN PATENT DOCUMENTS

| | | |
|---|---|---|
| TW | 200948073 A | 11/2009 |
| WO | 2013002701 A1 | 1/2013 |

OTHER PUBLICATIONS

Bross et al., "High Efficiency Video Coding (HEVC) text specification draft 6," JCTVC-H1003, Feb. 2012, pp. 75 and 92-93.*

(Continued)

*Primary Examiner* — Jay Patel
*Assistant Examiner* — Reza Aghevli
(74) *Attorney, Agent, or Firm* — Shumaker & Sieffert, P.A.

(57) ABSTRACT

A video decoder may be configured to decode a first value representative of a difference between a base most significant bits (MSBs) value of a picture order count (POC) value of a current picture of video data and a first MSBs value of a first POC value of a first long-term reference picture of the video data, decode a second value representative of a difference between a second MSBs value of a second POC value of a second long-term reference picture of the video data and the first MSBs value, wherein the first POC value and the second POC value have different least significant bits values, and decode at least a portion of a current picture of the video data relative to at least one of the first long-term reference picture and the second long-term reference picture.

30 Claims, 6 Drawing Sheets

(56) References Cited

U.S. PATENT DOCUMENTS

| | | | |
|---|---|---|---|
| 2005/0008240 A1* | 1/2005 | Banerji et al. | 382/238 |
| 2009/0052550 A1 | 2/2009 | Lamy-Bergot et al. | |
| 2009/0161760 A1 | 6/2009 | Gordon et al. | |
| 2009/0262804 A1 | 10/2009 | Pandit et al. | |
| 2012/0269275 A1 | 10/2012 | Hannuksela | |
| 2013/0142257 A1* | 6/2013 | Wang et al. | 375/240.12 |
| 2014/0126640 A1* | 5/2014 | Samuelsson et al. | 375/240.16 |

OTHER PUBLICATIONS

Boyce, "BoG Report on Decoded Picture Buffering and Reference Picture Signaling," JCTVC-H0715, Feb. 2012, p. 2.*

Hsiao et al., "Short/Long-Term Motion Vector Prediction in Multi-View Video Coding System," IEEE Int'l. Conf. on Image Processing, Oct. 24-27, 2004, pp. 1449-1452.*

Koyama et al., "Cyclic POC," JCTVC-I0045, Apr. 27-May 7, 2012, pp. 1-3.*

Boyce et al., "BoG Report on Decoded Picture Buffering and Reference Picture Signaling," JCT-VC Meeting; San Jose; (Joint Colloborative Team on Video Coding of ISO/IEC JTC1/SC29/WG11 and ITU-T SG.16); URL:HTTP://WFTP3.ITU.INT/AV-ARCH/JCTVC-SITE/,, No. JCTVC-H0715, Feb. 1-10, 2012, 9 pp.

Bross et al., "High efficiency video coding (HEVC) text specification draft 10 (for FDIS & Last Call)," 12th Meeting: Geneva, CH, Jan. 14-23, 2013, JCTVC-L1003_v34, 310 pp.

Bross et al., "High Efficiency Video Coding (HEVC) text specification draft 7," JCT-VC Meeting; MPEG Meeting; Geneva; (Joint Collaborative Team on Video Coding of ISO/IEC JTC1/SC29/WG11 and ITU-T SG.16); URL: http://wftp3.itu.int/av-arch/jctvc-site/, No. JCTVC-I1003_d0, Apr. 27-May 7, 2012, 270 pp.

Bross et al., "High efficiency video coding (HEVC) text specification draft 7," 9th Meeting: Geneva, CH, Apr. 27-May 7, 2012, JCTVC-I1003_d2, 290 pp.

Bross et al., "High efficiency video coding (HEVC) text specification draft 8," 10th Meeting: Stockholm, SE, Jul. 11-20, 2012, JCTVC-J1003_d7, 261 pp.

Bross et al., "High efficiency video coding (HEVC) text specification draft 6," 8th Meeting: San Jose, CA, USA, Feb. 1-10, 2012, JCTVC-H1003, 259 pp.

Bross et al., "High efficiency video coding (HEVC) text specification draft 9," 11th Meeting: Shanghai, CN, Oct. 10-19, 2012, JCTVC-K1003_v7, 290 pp.

Bross et al., "WD4: Working Draft 4 of High-Efficiency Video Coding," 6th Meeting: JCTVC-F803_d2, Torino, IT, Jul. 14-22, 2011, 226 pp.

Bross et al., "WD5: Working Draft 5 of High-Efficiency Video Coding," 7th Meeting: Geneva, Switzerland, Nov. 21-30, 2011, JCTVC-G1103_d2, 214 pp.

Flynn et al., "JCT-VC AHG report: Reference picture buffering and list construction (AHG21)," JCT-VC Meeting; MPEG Meeting; Geneva; (Joint Collaborative Team on Video Coding of ISO/IEC JTC1/SC29WG11 and ITU-T SG.16 ); URL: http://wftp3.itu.int/av-arch/jctvc-Site/,, No. JCTVC-G021, Nov. 21-30, 2011, 9 pp.

International Search Report and Written Opinion—PCT/US2013/047367—ISA/EPO—Sep. 25, 2013, 12 pp.

ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.

Koyama et al., "Cyclic POC," JCT-VC Meeting; MPEG Meeting; (Joint Colloborative Team on Video Coding of ISO/IEC JTC1/SC29/WG11 and ITU-T SG.16); URL: http://wftp3.itu.int/av-arch/jctvc-site/ ,, No. JCTVC-I0045, Apr. 27-May 7, 2012, 3 pp.

Wiegand et al., "WD2: Working Draft 2 of High-Efficiency Video Coding," JCTVC-D503, 4th Meeting: Daegu, KR, Jan. 20-28, 2011, 153 pp.

Wiegand et al., "WD3: Working Draft 3 of High-Efficiency Video Coding," Document JCTVC-E603, 5th Meeting: Geneva, CH, Mar. 16-23, 2011, 193 pp.

Wiegand et al., "WD1: Working Draft 1 of High-Efficiency Video Coding", JCTVC-C403, 3rd Meeting: Guangzhou, CN, Oct. 7-15, 2010, 137 pp.

ITU-T H.265, Series H: Audiovisual and Multimedia Systems, Infrastructure of audiovisual services—Coding of moving video, High efficiency video coding, The International Telecommunication Union, Apr. 2013, 317 pp.

International Preliminary Report on Patentability from international application No. PCT/US2013/047367, mailed Oct. 1, 2014, 11 pp.

Second Written Opinion of international application No. PCT/US2013/047367, mailed Jun. 10, 2014, 9 pp.

ITU-T H.264, Series H: Audiovisual and Multimedia Systems, Infrastructure of audiovisual services—Coding of moving video, Advanced video coding for generic audiovisual services, The International Telecommunication Union, Mar. 2005, 343 pp.

Bross et al., "High Efficiency Video Coding (HEVC) Text Specification Draft 7," Joint Collaborative Team on Video Coding (JCT-VC) of ITU-T SG16 WP3 and ISO/IEC JTC1/SC29/WG11, JCTV-I1003_d4, 9th Meeting: Geneva, CH, Apr. 27-May 7, 2012, 297 pp.

* cited by examiner

SIGNALING LONG-TERM REFERENCE PICTURES FOR VIDEO CODING

This application claims the benefit of U.S. Provisional Application Ser. No. 61/665,784, filed Jun. 28, 2012, the entire contents of which are hereby incorporated by reference.

TECHNICAL FIELD

This disclosure relates to video coding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards. A recent draft of the upcoming HEVC standard, referred to as "HEVC Working Draft 7," or "WD7," is described in document JCTVC-I1003, Bross et al., "High efficiency video coding (HEVC) text specification draft 7," Joint Collaborative Team on Video Coding (JCT-VC) of ITU-T SG16 WP3 and ISO/IEC JTC1/SC29/WG11, 9th Meeting: San Jose, Calif., USA, 27 Apr. to 7 May, 2012, which, as of May 13, 2013, is downloadable from http://phenix.int-evey.fr/jct/doc_end_user/documents/8_San%20Jose/wg11/JCTVC-H1003-v22.zip. Video coding devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video frame or a portion of a video frame) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to a reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

SUMMARY

In general, this disclosure describes techniques for signaling long-term reference pictures for video coding. A reference picture generally corresponds to a picture that may be used for reference for temporal predictive coding of data of other pictures. In general, long-term reference pictures are stored in a decoded picture buffer longer than other reference pictures, e.g., short-term reference pictures. This disclosure describes various techniques related to signaling related to long-term reference pictures, e.g., signaling long-term reference pictures in slice headers of slices of pictures. The techniques of this disclosure may provide improvement for signaling methods of long-term reference pictures in the slice header, e.g., in terms of efficiency and/or applicability.

In one example, a method includes decoding a first value representative of a difference between a base most significant bits (MSBs) value of a picture order count (POC) value of a current picture of video data and a first MSBs value of a first POC value of a first long-term reference picture of the video data, decoding a second value representative of a difference between a second MSBs value of a second POC value of a second long-term reference picture of the video data and the first MSBs value, wherein the first POC value and the second POC value have different least significant bits (LSBs) values, and decoding at least a portion of a current picture of the video data relative to at least one of the first long-term reference picture using the first value and the second long-term reference picture using the first value and the second value.

In another example, a device for decoding video data includes a video decoder configured to decode a first value representative of a difference between a base most significant bits (MSBs) value of a picture order count (POC) value of a current picture of video data and a first MSBs value of a first POC value of a first long-term reference picture of the video data, decode a second value representative of a difference between a second MSBs value of a second POC value of a second long-term reference picture of the video data and the first MSBs value, wherein the first POC value and the second POC value have different least significant bits (LSBs) values, and decode at least a portion of a current picture of the video data relative to at least one of the first long-term reference picture using the first value and the second long-term reference picture using the first value and the second value.

In another example, a device includes means for decoding a first value representative of a difference between a base most significant bits (MSBs) value of a picture order count (POC) value of a current picture of video data and a first MSBs value of a first POC value of a first long-term reference picture of the video data, means for decoding a second value representative of a difference between a second MSBs value of a second POC value of a second long-term reference picture of the video data and the first MSBs value, wherein the first POC value and the second POC value have different least significant bits (LSBs) values, and means for decoding at least a portion of a current picture of the video data relative to at least one of the first long-term reference picture using the first value and the second long-term reference picture using the first value and the second value.

In another example, a computer-readable storage medium has stored thereon instructions that, when executed, cause a processor to decode a first value representative of a difference between a base most significant bits (MSBs) value of a picture order count (POC) value of a current picture of video data and a first MSBs value of a first POC value of a first long-term reference picture of the video data, decode a second value representative of a difference between a second MSBs value of a second POC value of a second long-term reference picture of the video data and the first MSBs value, wherein the first POC value and the second POC value have different least significant bits (LSBs) values, and decode at least a portion of a current picture of the video data relative to at least one of the first long-term reference picture using the first value and the second long-term reference picture using the first value and the second value.

In another example, a method of encoding video data includes encoding at least a first portion of a current picture of video data relative to a first long-term reference picture and at least a second portion of the current picture to a second long-term reference picture, encoding a first value representative of a difference between a base most significant bits (MSBs) value of a picture order count (POC) value of a current picture of the video data and a first MSBs value of a first POC value of the first long-term reference picture of the video data, and encoding a second value representative of a difference between a second MSBs value of a second POC value of the second long-term reference picture of the video data and the first MSBs value, wherein the first POC value and the second POC value have different least significant bits (LSBs) values.

In another example, a device for encoding video data includes a video encoder configured to encode at least a first portion of a current picture of video data relative to a first long-term reference picture and at least a second portion of the current picture to a second long-term reference picture, encode a first value representative of a difference between a base most significant bits (MSBs) value of a picture order count (POC) value of a current picture of the video data and a first MSBs value of a first POC value of the first long-term reference picture of the video data, and encode a second value representative of a difference between a second MSBs value of a second POC value of the second long-term reference picture of the video data and the first MSBs value, wherein the first POC value and the second POC value have different least significant bits (LSBs) values.

In another example, a device for encoding video data includes means for encoding at least a first portion of a current picture of video data relative to a first long-term reference picture and at least a second portion of the current picture to a second long-term reference picture, means for encoding a first value representative of a difference between a base most significant bits (MSBs) value of a picture order count (POC) value of a current picture of the video data and a first MSBs value of a first POC value of the first long-term reference picture of the video data, and means for encoding a second value representative of a difference between a second MSBs value of a second POC value of the second long-term reference picture of the video data and the first MSBs value, wherein the first POC value and the second POC value have different least significant bits (LSBs) values.

In another example, a computer-readable storage medium has stored thereon instructions that cause a processor to encode at least a first portion of a current picture of video data relative to a first long-term reference picture and at least a second portion of the current picture to a second long-term reference picture, encode a first value representative of a difference between a base most significant bits (MSBs) value of a picture order count (POC) value of a current picture of the video data and a first MSBs value of a first POC value of the first long-term reference picture of the video data, and encode a second value representative of a difference between a second MSBs value of a second POC value of the second long-term reference picture of the video data and the first MSBs value, wherein the first POC value and the second POC value have different least significant bits (LSBs) values.

The details of one or more examples are set forth in the accompanying drawings and the description below. Other features, objects, and advantages will be apparent from the description and drawings, and from the claims.

DETAILED DESCRIPTION

Figure 1:
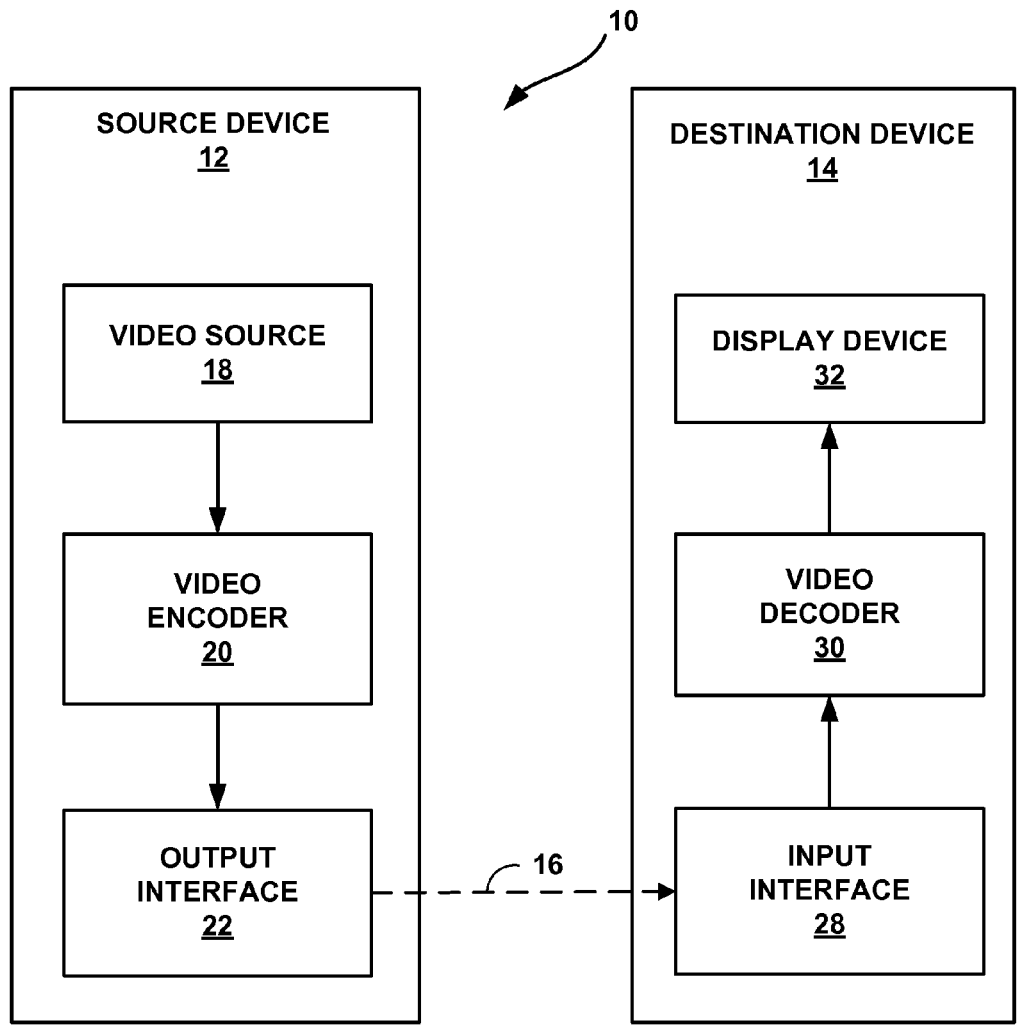
FIG. 1 is a block diagram illustrating an example video encoding and decoding system that may utilize techniques for improved signaling of long-term reference pictures in slice headers.

In general, video data is represented by a sequence of pictures that are captured or displayed in rapid succession. It should be understood that in some examples, pictures or portions of the pictures may be generated, e.g., using computer graphics, rather than (or in addition to) being captured. The order in which the pictures are to be displayed (which may generally be the same as the order in which the pictures are captured or generated) may differ from an order in which the pictures are coded. The display order of pictures is generally represented by picture order count (POC) values, while the coding order of pictures is generally represented by frame number (frame_num) values.

Coding of pictures generally involves taking advantage of redundant data occurring in the pictures. For example, spatial coding, also referred to as intra-predictive coding, takes advantage of redundancies occurring between spatially neighboring blocks of pixel values of a common picture. As another example, temporal coding, also referred to as inter-predictive coding, takes advantage of redundancies occurring between different pictures that are captured, generated, or displayed at different temporal instances. More particularly, a picture may be divided into slices, which may be designated for intra- or inter-prediction. Moreover, each slice may be divided into blocks (e.g., largest coding units (LCUs)), and each of the blocks may be either further partitioned or coded based on whether the corresponding slice has been designated for intra- or inter-prediction.

With respect to the example of inter-predictive coding, blocks of a picture currently being coded (also referred to as a "current picture") may be predicted from a reference picture. WD7 defines a "reference picture" as a picture with a nal_ref_flag equal to 1. The nal_ref_flag is a syntax element of a network abstraction layer (NAL) unit indicating whether data included in the NAL unit is to be treated as a reference picture. WD7 also provides that a reference picture contains samples (that is, pixel values) that may be used for inter prediction in the decoding process of subsequent pictures in decoding order.

Moreover, WD7 distinguishes long-term reference pictures from short-term reference pictures. For example, WD7 defines a long-term reference picture as a reference picture that is marked as "used for long-term reference." WD7 provides that a flag in a sequence parameter set (SPS) indicates whether long-term reference pictures are signaled at all for a coded video sequence. In accordance with WD7, video coders signal least significant bits (LSBs) of POC values of long-term reference pictures in slice headers of slices. Signaling the LSBs may result in a bit savings, relative to signaling the full POC value. Video coders, in accordance with WD7, may signal the most significant bits (MSBs) of the POC values of long-term reference pictures if there are more than one reference pictures in a decoded picture buffer (DPB) that have the same LSB bits as a long-term reference picture. Moreover, in accordance with WD7, video coders may use a flag to indicate whether the signaled long-term reference pictures may be used by a current picture for reference.

Video coders may maintain the MSBs of the current picture, referred to herein as a "base MSB value," and signal the MSBs of long-term reference picture i using offset values relative to the base MSB values, e.g., using the syntax element delta_poc_msb_cycle_lt[i] for picture i. This syntax element is referred to below as the "MSB cycle" value. In other words, to calculate the POC value for a particular picture, a video coder may calculate: (base MSB+MSB cycle for the picture) concatenated with (LSBs for the picture).

In WD7, the MSB cycle value was coded as a difference between the base MSB value and the MSBs for a picture for which the MSB cycle was being signaled, i.e., picture i. Only when two or more long-term reference pictures with the same LSB values were signaled, the MSB cycle of the first such long-term reference picture would be signaled as such and the MSB cycle values for the rest of the long-term reference pictures were signaled as relative offsets of each other. However, this signaling of long-term reference pictures, in accordance with WD7, may experience one or more deficiencies. For example, if there are two long-term reference pictures with different LSB values, but both have delta_poc_msb_cycle_lt[i] signaled, the current syntax would signal the delta_poc_msb_cycle_lt[i] as discussed above, i.e., as an offset relative to the base MSB value. However, this disclosure recognizes that signaling the difference between MSB cycle values for the pictures may be more efficient.

The signaling of identification data for long-term reference pictures in the slice header, in accordance with WD7, may experience one or more deficiencies. For example, if a current picture has a POC value equal to MaxPicOrderCntLsb*N−1, and the picture that has a POC value equal to MaxPicOrderCntLsb*N is the first long-term reference picture for which the delta_poc_msb_cycle_lt[i] is signalled, then WD7 does not provide techniques for signaling delta_poc_msb_cycle_lt[i]. The value of delta_poc_msb_cycle_lt[i], in this case, should be, but cannot be, −1 (negative one).

As another example, if there are two long-term reference pictures with different LSB values, but both have delta_poc_msb_cycle_lt[i] signaled, the current syntax would signal the delta_poc_msb_cycle_lt[i] as such. However, this disclosure recognizes that signaling the difference for one of the pictures would be more efficient.

As another example, when there is more than one reference picture in the DPB that has the same LSB as that of the long-term reference picture signaled, WD7 mandates that the MSB cycle of the LTRP also be signaled using the delta_poc_msb_cycle_lt[i] syntax element. However, this disclosure recognizes that, if there is a picture in the DPB that will be marked as a short-term reference picture by the current picture, then including the short-term reference picture in the candidate set of long-term reference pictures may end up signaling more MSB bits than needed.

As another example, when there are n reference pictures in the DPB that have POC LSB equal to poc_lsb_lt[i], and where k long-term reference pictures, where k is less than or equal to n, are signaled in the current picture that have LSBs equal to poc_lsb_lt[i], the syntax defined in WD7 mandates that all the k pictures will have delta_poc_msb_present_flag[i] set to 1. However, if k=n, this disclosure recognizes that a video coder need not set delta_poc_msb_present_flag[i] as 1 for all k of the long-term reference pictures, but that it would be sufficient to set delta_poc_msb_present_flag[i] as 1 for n−1 pictures. The techniques of this disclosure, as described in greater detail with respect to the figures below, may overcome any or all of these deficiencies. In general, this disclosure describes various techniques that may improve signaling for long-term reference pictures in a slice header.

FIG. 1 is a block diagram illustrating an example video encoding and decoding system 10 that may utilize techniques for improved signaling of long-term reference pictures in slice headers. As shown in FIG. 1, system 10 includes a source device 12 that provides encoded video data to be decoded at a later time by a destination device 14. In particular, source device 12 provides the video data to destination device 14 via a computer-readable medium 16. Source device 12 and destination device 14 may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

Destination device 14 may receive the encoded video data to be decoded via computer-readable medium 16. Computer-readable medium 16 may comprise any type of medium or device capable of moving the encoded video data from source device 12 to destination device 14. In one example, computer-readable medium 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

In some examples, encoded data may be output from output interface 22 to a storage device. Similarly, encoded data may be accessed from the storage device by input interface.

The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device 12.

Destination device 14 may access stored video data from the storage device via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes video source 18, video encoder 20, and output interface 22. Destination device 14 includes input interface 28, video decoder 30, and display device 32. In accordance with this disclosure, video encoder 20 of source device 12 may be configured to apply the techniques for improved signaling of long-term reference pictures in slice headers. In other examples, a source device and a destination device may include other components or arrangements. For example, source device 12 may receive video data from an external video source 18, such as an external camera. Likewise, destination device 14 may interface with an external display device, rather than including an integrated display device.

The illustrated system 10 of FIG. 1 is merely one example. Techniques for improved signaling of long-term reference pictures in slice headers may be performed by any digital video encoding and/or decoding device. Although generally the techniques of this disclosure are performed by a video encoding device, the techniques may also be performed by a video encoder/decoder, typically referred to as a "CODEC." Moreover, the techniques of this disclosure may also be performed by a video preprocessor. Source device 12 and destination device 14 are merely examples of such coding devices in which source device 12 generates coded video data for transmission to destination device 14. In some examples, devices 12, 14 may operate in a substantially symmetrical manner such that each of devices 12, 14 include video encoding and decoding components. Hence, system 10 may support one-way or two-way video transmission between video devices 12, 14, e.g., for video streaming, video playback, video broadcasting, or video telephony.

Video source 18 of source device 12 may include a video capture device, such as a video camera, a video archive containing previously captured video, and/or a video feed interface to receive video from a video content provider. As a further alternative, video source 18 may generate computer graphics-based data as the source video, or a combination of live video, archived video, and computer-generated video. In some cases, if video source 18 is a video camera, source device 12 and destination device 14 may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by video encoder 20. The encoded video information may then be output by output interface 22 onto a computer-readable medium 16.

Computer-readable medium 16 may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from source device 12 and provide the encoded video data to destination device 14, e.g., via network transmission. Similarly, a computing device of a medium production facility, such as a disc stamping facility, may receive encoded video data from source device 12 and produce a disc containing the encoded video data. Therefore, computer-readable medium 16 may be understood to include one or more computer-readable media of various forms, in various examples.

Input interface 28 of destination device 14 receives information from computer-readable medium 16. The information of computer-readable medium 16 may include syntax information defined by video encoder 20, which is also used by video decoder 30, that includes syntax elements that describe characteristics and/or processing of blocks and other coded units, e.g., GOPs. Display device 32 displays the decoded video data to a user, and may comprise any of a variety of display devices such as a cathode ray tube (CRT), a liquid crystal display (LCD), a plasma display, an organic light emitting diode (OLED) display, or another type of display device.

Video encoder 20 and video decoder 30 may operate according to a video coding standard, such as the High Efficiency Video Coding (HEVC) standard presently under development, and may conform to the HEVC Test Model (HM). Alternatively, video encoder 20 and video decoder 30 may operate according to other proprietary or industry standards, such as the ITU-T H.264 standard, alternatively referred to as MPEG-4, Part 10, Advanced Video Coding (AVC), or extensions of such standards. The techniques of this disclosure, however, are not limited to any particular coding standard. Other examples of video coding standards include MPEG-2 and ITU-T H.263. Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

The ITU-T H.264/MPEG-4 (AVC) standard was formulated by the ITU-T Video Coding Experts Group (VCEG) together with the ISO/IEC Moving Picture Experts Group (MPEG) as the product of a collective partnership known as the Joint Video Team (JVT). In some aspects, the techniques described in this disclosure may be applied to devices that generally conform to the H.264 standard. The H.264 standard is described in ITU-T Recommendation H.264, Advanced Video Coding for generic audiovisual services, by the ITU-T Study Group, and dated March, 2005, which may be referred to herein as the H.264 standard or H.264 specification, or the H.264/AVC standard or specification. The Joint Video Team (JVT) continues to work on extensions to H.264/MPEG-4 AVC.

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device.

The JCT-VC is working on development of the HEVC standard. The HEVC standardization efforts are based on an evolving model of a video coding device referred to as the HEVC Test Model (HM). The HM presumes several additional capabilities of video coding devices relative to existing devices according to, e.g., ITU-T H.264/AVC. For example, whereas H.264 provides nine intra-prediction encoding modes, the HM may provide as many as thirty-three intra-prediction encoding modes.

In general, the working model of the HM describes that a video frame or picture may be divided into a sequence of treeblocks or largest coding units (LCU) that include both luma and chroma samples. Syntax data within a bitstream may define a size for the LCU, which is a largest coding unit in terms of the number of pixels. A slice includes a number of consecutive treeblocks in coding order. A video frame or picture may be partitioned into one or more slices. Each treeblock may be split into coding units (CUs) according to a quadtree. In general, a quadtree data structure includes one node per CU, with a root node corresponding to the treeblock. If a CU is split into four sub-CUs, the node corresponding to the CU includes four leaf nodes, each of which corresponds to one of the sub-CUs.

Each node of the quadtree data structure may provide syntax data for the corresponding CU. For example, a node in the quadtree may include a split flag, indicating whether the CU corresponding to the node is split into sub-CUs. Syntax elements for a CU may be defined recursively, and may depend on whether the CU is split into sub-CUs. If a CU is not split further, it is referred as a leaf-CU. In this disclosure, four sub-CUs of a leaf-CU will also be referred to as leaf-CUs even if there is no explicit splitting of the original leaf-CU. For example, if a CU at 16×16 size is not split further, the four 8×8 sub-CUs will also be referred to as leaf-CUs although the 16×16 CU was never split.

A CU has a similar purpose as a macroblock of the H.264 standard, except that a CU does not have a size distinction. For example, a treeblock may be split into four child nodes (also referred to as sub-CUs), and each child node may in turn be a parent node and be split into another four child nodes. A final, unsplit child node, referred to as a leaf node of the quadtree, comprises a coding node, also referred to as a leaf-CU. Syntax data associated with a coded bitstream may define a maximum number of times a treeblock may be split, referred to as a maximum CU depth, and may also define a minimum size of the coding nodes. Accordingly, a bitstream may also define a smallest coding unit (SCU). This disclosure uses the term "block" to refer to any of a CU, PU, or TU, in the context of HEVC, or similar data structures in the context of other standards (e.g., macroblocks and sub-blocks thereof in H.264/AVC).

A CU includes a coding node and prediction units (PUs) and transform units (TUs) associated with the coding node. A size of the CU corresponds to a size of the coding node and must be square in shape. The size of the CU may range from 8×8 pixels up to the size of the treeblock with a maximum of 64×64 pixels or greater. Each CU may contain one or more PUs and one or more TUs. Syntax data associated with a CU may describe, for example, partitioning of the CU into one or more PUs. Partitioning modes may differ between whether the CU is skip or direct mode encoded, intra-prediction mode encoded, or inter-prediction mode encoded. PUs may be partitioned to be non-square in shape. Syntax data associated with a CU may also describe, for example, partitioning of the CU into one or more TUs according to a quadtree. A TU can be square or non-square (e.g., rectangular) in shape.

The HEVC standard allows for transformations according to TUs, which may be different for different CUs. The TUs are typically sized based on the size of PUs within a given CU defined for a partitioned LCU, although this may not always be the case. The TUs are typically the same size or smaller than the PUs. In some examples, residual samples corresponding to a CU may be subdivided into smaller units using a quadtree structure known as "residual quad tree" (RQT). The leaf nodes of the RQT may be referred to as transform units (TUs). Pixel difference values associated with the TUs may be transformed to produce transform coefficients, which may be quantized.

A leaf-CU may include one or more prediction units (PUs). In general, a PU represents a spatial area corresponding to all or a portion of the corresponding CU, and may include data for retrieving a reference sample for the PU. Moreover, a PU includes data related to prediction. For example, when the PU is intra-mode encoded, data for the PU may be included in a residual quadtree (RQT), which may include data describing an intra-prediction mode for a TU corresponding to the PU. As another example, when the PU is inter-mode encoded, the PU may include data defining one or more motion vectors for the PU. The data defining the motion vector for a PU may describe, for example, a horizontal component of the motion vector, a vertical component of the motion vector, a resolution for the motion vector (e.g., one-quarter pixel precision or one-eighth pixel precision), a reference picture to which the motion vector points, and/or a reference picture list (e.g., List 0, List 1, or List C) for the motion vector.

A leaf-CU having one or more PUs may also include one or more transform units (TUs). The transform units may be specified using an RQT (also referred to as a TU quadtree structure), as discussed above. For example, a split flag may indicate whether a leaf-CU is split into four transform units. Then, each transform unit may be split further into further sub-TUs. When a TU is not split further, it may be referred to as a leaf-TU. Generally, for intra coding, all the leaf-TUs belonging to a leaf-CU share the same intra prediction mode. That is, the same intra-prediction mode is generally applied to calculate predicted values for all TUs of a leaf-CU. For intra coding, a video encoder may calculate a residual value for each leaf-TU using the intra prediction mode, as a difference between the portion of the CU corresponding to the TU and the original block. A TU is not necessarily limited to the size of a PU. Thus, TUs may be larger or smaller than a PU. For intra coding, a PU may be collocated with a corresponding leaf-TU for the same CU. In some examples, the maximum size of a leaf-TU may correspond to the size of the corresponding leaf-CU.

Moreover, TUs of leaf-CUs may also be associated with respective quadtree data structures, referred to as residual quadtrees (RQTs). That is, a leaf-CU may include a quadtree indicating how the leaf-CU is partitioned into TUs. The root node of a TU quadtree generally corresponds to a leaf-CU, while the root node of a CU quadtree generally corresponds to a treeblock (or LCU). TUs of the RQT that are not split are referred to as leaf-TUs. In general, this disclosure uses the terms CU and TU to refer to leaf-CU and leaf-TU, respectively, unless noted otherwise.

A video sequence typically includes a series of video frames or pictures. A group of pictures (GOP) generally comprises a series of one or more of the video pictures. A GOP may include syntax data in a header of the GOP, a header of one or more of the pictures, or elsewhere, that describes a number of pictures included in the GOP. Each slice of a picture may include slice syntax data that describes an encoding mode for the respective slice. Video encoder 20 typically operates on video blocks within individual video slices in order to encode the video data. A video block may correspond to a coding node within a CU. The video blocks may have fixed or varying sizes, and may differ in size according to a specified coding standard.

As an example, the HM supports prediction in various PU sizes. Assuming that the size of a particular CU is 2N×2N, the HM supports intra-prediction in PU sizes of 2N×2N or N×N, and inter-prediction in symmetric PU sizes of 2N×2N, 2N×N, N×2N, or N×N. The HM also supports asymmetric partitioning for inter-prediction in PU sizes of 2N×nU, 2N×nD, nL×2N, and nR×2N. In asymmetric partitioning, one direction of a CU is not partitioned, while the other direction is partitioned into 25% and 75%. The portion of the CU corresponding to the 25% partition is indicated by an "n" followed by an indication of "Up", "Down," "Left," or "Right." Thus, for example, "2N×nU" refers to a 2N×2N CU that is partitioned horizontally with a 2N×0.5N PU on top and a 2N×1.5N PU on bottom.

In this disclosure, "N×N" and "N by N" may be used interchangeably to refer to the pixel dimensions of a video block in terms of vertical and horizontal dimensions, e.g., 16×16 pixels or 16 by 16 pixels. In general, a 16×16 block will have 16 pixels in a vertical direction (y=16) and 16 pixels in a horizontal direction (x=16). Likewise, an N×N block generally has N pixels in a vertical direction and N pixels in a horizontal direction, where N represents a nonnegative integer value. The pixels in a block may be arranged in rows and columns. Moreover, blocks need not necessarily have the same number of pixels in the horizontal direction as in the vertical direction. For example, blocks may comprise N×M pixels, where M is not necessarily equal to N.

Following intra-predictive or inter-predictive coding using the PUs of a CU, video encoder 20 may calculate residual data for the TUs of the CU. The PUs may comprise syntax data describing a method or mode of generating predictive pixel data in the spatial domain (also referred to as the pixel domain) and the TUs may comprise coefficients in the transform domain following application of a transform, e.g., a discrete cosine transform (DCT), an integer transform, a wavelet transform, or a conceptually similar transform to residual video data. The residual data may correspond to pixel differences between pixels of the unencoded picture and prediction values corresponding to the PUs. Video encoder 20 may form the TUs including the residual data for the CU, and then transform the TUs to produce transform coefficients for the CU.

Following any transforms to produce transform coefficients, video encoder 20 may perform quantization of the transform coefficients. Quantization generally refers to a process in which transform coefficients are quantized to possibly reduce the amount of data used to represent the coefficients, providing further compression. The quantization process may reduce the bit depth associated with some or all of the coefficients. For example, an n-bit value may be rounded down to an m-bit value during quantization, where n is greater than m.

Following quantization, the video encoder may scan the transform coefficients, producing a one-dimensional vector from the two-dimensional matrix including the quantized transform coefficients. The scan may be designed to place higher energy (and therefore lower frequency) coefficients at the front of the array and to place lower energy (and therefore higher frequency) coefficients at the back of the array. In some examples, video encoder 20 may utilize a predefined scan order to scan the quantized transform coefficients to produce a serialized vector that can be entropy encoded. In other examples, video encoder 20 may perform an adaptive scan. After scanning the quantized transform coefficients to form a one-dimensional vector, video encoder 20 may entropy encode the one-dimensional vector, e.g., according to context-adaptive variable length coding (CAVLC), context-adaptive binary arithmetic coding (CABAC), syntax-based context-adaptive binary arithmetic coding (SBAC), Probability Interval Partitioning Entropy (PIPE) coding or another entropy encoding methodology. Video encoder 20 may also entropy encode syntax elements associated with the encoded video data for use by video decoder 30 in decoding the video data.

To perform CABAC, video encoder 20 may assign a context within a context model to a symbol to be transmitted. The context may relate to, for example, whether neighboring values of the symbol are non-zero or not. To perform CAVLC, video encoder 20 may select a variable length code for a symbol to be transmitted. Codewords in VLC may be constructed such that relatively shorter codes correspond to more probable symbols, while longer codes correspond to less probable symbols. In this way, the use of VLC may achieve a bit savings over, for example, using equal-length codewords for each symbol to be transmitted. The probability determination may be based on a context assigned to the symbol.

In accordance with the techniques of this disclosure, video encoder 20 and video decoder 30 may be configured to utilize improved techniques for signaling data for identifying long-term reference pictures, e.g., in slice headers, parameter sets (including picture parameter sets (PPSs) and sequence parameter sets (SPSs)), or the like. In general, video encoder 20 and video decoder 30 may be configured to perform any or all of the techniques of this disclosure, alone or in any combination. In some examples, video encoder 20 and video decoder 30 may be configured to perform methods for signaling negative values of delta POC MSB cycle for long-term reference pictures. In some examples, video encoder 20 and video decoder 30 may be configured to perform methods for more efficient signaling of delta POC MSB cycle values for long-term reference pictures with different LSB values using differential coding.

In some examples, reference pictures that are signalled as short-term reference pictures for a current picture (or that are included in the short-term reference picture set of the current picture) may be excluded from reference pictures utilized in deciding whether to send delta POC MSB cycle values for long-term reference pictures, to avoid sending unnecessary delta POC MSB cycle values. In some examples, when there are n reference pictures (including or excluding short-term reference pictures) in the DPB that have POC LSB equal to poc_lsb_lt[i], and when n long-term reference pictures are signaled in the current picture that have LSB values equal to poc_lsb_lt[i], video encoder 20 may only send, and video decoder 30 may only receive, the delta POC MSB cycle values for n−1 long-term reference pictures, though it is possible for this data to be sent for all n of the long-term reference pictures.

Any or all of the various techniques above may be implemented according to the following example implementation. A syntax element of WD7 that describes the MSB cycle of a long-term reference picture may be modified, as shown below. This disclosure also describes an example method for deriving the array DeltaPocMSBCycleLt[ ]. This disclosure further describes an example decoding process for a reference picture set. Moreover, this disclosure describes semantics for syntax elements delta_poc_msb_present_flag[i] and poc_lsb_lt[i]. The syntax and semantics of other syntax elements of WD7 may remain unchanged.

Table 1 represents an example set of syntax for a slice header. Underlined text represents changes to the slice header syntax relative to WD7. Semantics for changed syntax elements, as well as changed semantics for other syntax elements, are discussed below.

TABLE 1

| slice_header( ) { | Descriptor |
|---|---|
| ... | |
| short_term_ref_pic_set_idx | u(v) |
| if( long_term_ref_pics_present_flag ) { | |
| num_long_term_pics | ue(v) |
| for( i = 0; i < num_long_term_pics; i++ ) { | |
| poc_lsb_lt[ i ] | u(v) |
| delta_poc_msb_present_flag[ i ] | u(1) |
| if( delta_poc_msb_present_flag[ i ] ) | |
| delta_poc_msb_cycle_lt_plus1[i] | ue(v) |
| used_by_curr_pic_lt_flag[ i ] | u(1) |
| } | |
| } | |
| ... | |
| byte_alignment( ) | |
| } | |

In the example of Table 1, the slice header syntax includes the additional element delta_poc_msb_cycle_lt_plus1[i]. Semantics for this syntax element are described below. In some examples, poc_lsb_lt[i] may specify the value of the least significant bits of the picture order count value of the i-th long-term reference picture that is included in the long-term reference picture set of the current picture. The length of the poc_lsb_lt[i] syntax element may be log 2_max_pic_order_cnt_lsb_minus4+4 bits.

In some examples, delta_poc_msb_present_flag[i] equal to 1 may specify that delta_poc_msb_cycle_lt_plus1[i] is present. delta_poc_msb_present_flag[i] equal to 0 may specify that delta_poc_msb_cycle_lt_plus1[i] is not present. delta_poc_msb_present_flag[i] may be set equal to 1 when there are j reference pictures, where j is an integer value greater than 1, in the decoded picture buffer, excluding those pictures that are marked as "used for short-term reference" by the current picture, with the least significant bits of the picture order count value equal to poc_lsb_lt[i], and when the i-th long-term reference picture is not the j-th long-term reference picture with the least significant bits of the picture order count value equal to poc_lsb_lt[i] that is signaled by the current picture.

In some examples, delta_poc_msb_cycle_lt_plus1[i] may be used to determine the value of the most significant bits of the picture order count value of the i-th long-term reference picture that is included in the long-term reference picture set of the current picture. When not signalled, delta_poc_msb_cycle_lt_plus1[i] may take the value 1.

The variable DeltaPocMSBCycleLt[i] may be derived according to the following algorithm, where (7-37) refers to a section of HEVC, that is, a changed section relative to WD7. Note that the example derivation below implies that the MSB cycles are sent in increasing order of their values.

DeltaPocMSBCycleLt[ i ] = delta_poc_msb_present_flag[ i ] *
    (delta_poc_msb_cycle_lt_plus1[ i ] − 1 );
if( i != 0 )                                                                                                             (7-37)
    DeltaPocMSBCycleLt[ i ] + = DeltaPocMSBCycleLt[ i − 1 ];

The value of DeltaPocMSBCycleLt[i]*MaxPicOrderCntLsb+pic_order_cnt_lsb−poc_lsb_lt[i] may be in the range of 1 to $2^{24}-1$, inclusive. Alternatively, the MSB cycle may be sent by signaling delta_poc_msb_cycle_lt_plusN[i] as ue(v) (that is, as an unsigned integer Exp-Golomb-coded syntax element with the left bit first), instead of delta_poc_msb_cycle_lt_plus1[i], where N is a value greater than 1. Alternatively, the MSB cycle may be sent by signaling delta_poc_msb_cycle_lt[i] as se(v) (that is, as a signed integer Exp-Golomb-coded syntax element with the left bit first), instead of delta_poc_msb_cycle_lt_plus1[i].

In other words, in accordance with the techniques of this disclosure, a value representative of the MSB cycle for picture i (e.g., delta_poc_msb_cycle_lt_plus1[i], which is actually signaled in the bitstream) may be calculated relative to the MSB cycle of a previously coded long-term reference picture, e.g., picture i−1, rather than relative to the base MSB value. This is mathematically equivalent to calculating the value representative of the MSB cycle for picture i as the difference between the MSBs of the POC value for picture i and the MSBs of the POC value for picture i−1, assuming this value is ultimately added to the MSB cycle value for picture i−1 to represent the true MSB cycle value for picture i (which is the difference between the MSB for picture i and the base MSB). This may achieve a bit savings in a bitstream, because values representing differences between sequential MSB cycle values may be smaller than differences between MSBs of long-term reference pictures and the base MSB.

In some examples, video encoder 20 and video decoder 30 may perform a derivation process for the reference picture set and picture marking according to the following ordered steps, where DPB refers to the decoded picture buffer as described in Annex C of WD7. Note that the order of short-term reference picture and long-term reference picture subset derivations in the example below are swapped relative to the order in WD7. Parenthetical references near the right margin are intended to refer to sections of WD7. This and other changes relative to the algorithm of WD7 are noted using underlined text in the example below:

1. The following applies:

for( i = 0; i < NumPocStCurrBefore; i++ )
    if( there is a short-term reference picture picX in the DPB
            with PicOrderCntVal equal to PocStCurrBefore[ i ])
        RefPicSetStCurrBefore[ i ] = picX
    else
        RefPicSetStCurrBefore[ i ] = "no reference picture"

-continued

```
for( i = 0; i < NumPocStCurrAfter; i++ )
    if( there is a short-term reference picture picX in the DPB
            with PicOrderCntVal equal to PocStCurrAfter[ i ])
        RefPicSetStCurrAfter[ i ] = picX
    else
        RefPicSetStCurrAfter[ i ] = "no reference picture"         (8-7)
for( i = 0; i < NumPocStFoll; i++ )
    if( there is a short-term reference picture picX in the DPB
            with PicOrderCntVal equal to PocStFoll[ i ])
        RefPicSetStFoll[ i ] = picX
    else
        RefPicSetStFoll[ i ] = "no reference picture"
```

2. All reference pictures included in RefPicSetStCurrBefore, RefPicSetStCurrAfter and RefPicSetStFoll are marked as "used for short-term reference".

3. The following applies:

```
for( i = 0; i < NumPocLtCurr; i++ ) {
    if( !delta_poc_msb_present_flag[ i ] ) {
        if( there is a long-term reference picture picX in the DPB
                with pic_order_cnt_lsb equal to PocLtCurr[ i ]
                andisnotincludedinanyofRefPicSetStCurrBefore,
                RefPicSetStCurrAfterandRefPicSetStFoll)
            RefPicSetLtCurr[ i ] = picX
        else if( there is a short-term reference picture picY in the DPB
                with pic_order_cnt_lsb equal to PocLtCurr[ i ]
                andisnotincludedinanyofRefPicSetStCurrBefore,
                RefPicSetStCurrAfterandRefPicSetStFoll)
            RefPicSetLtCurr[ i ] = picY
        else
            RefPicSetLtCurr[ i ] = "no reference picture"
    } else {
        if( there is a long-term reference picture picX in the DPB
                with PicOrderCntVal equal to PocLtCurr[ i ]
                andisnotincludedinanyofRefPicSetStCurrBefore,
                RefPicSetStCurrAfterandRefPicSetStFoll)
            RefPicSetLtCurr[ i ] = picX
        else if( there is a short-term reference picture picY in the DPB
                with PicOrderCntVal equal to PocLtCurr[ i ]
                andisnotincludedinanyofRefPicSetStCurrBefore,
                RefPicSetStCurrAfterandRefPicSetStFoll)
            RefPicSetLtCurr[ i ] = picY
        else
            RefPicSetLtCurr[ i ] = "no reference picture"
    }
}                                                                   (8-6)
for( i = 0; i < NumPocLtFoll; i++ ) {
    if( !delta_poc_msb_present_flag[ i ] ) {
        if( there is a long-term reference picture picX in the DPB
                with pic_order_cnt_lsb equal to PocLtFoll[ i ]
                andisnotincludedinanyofRefPicSetStCurrBefore,
                RefPicSetStCurrAfterandRefPicSetStFoll)
            RefPicSetLtFoll[ i ] = picX
        else if( there is a short-term reference picture picY in the DPB
                with pic_order_cnt_lsb equal to PocLtFoll[ i ]
                andisnotincludedinanyofRefPicSetStCurrBefore,
                RefPicSetStCurrAfterandRefPicSetStFoll)
            RefPicSetLtFoll[ i ] = picY
        else
            RefPicSetLtFoll[ i ] = "no reference picture"
    } else {
        if( there is a long-term reference picture picX in the DPB
                with PicOrderCntVal to PocLtFoll[ i ]
                andisnotincludedinanyofRefPicSetStCurrBefore,
                RefPicSetStCurrAfterandRefPicSetStFoll)
            RefPicSetLtFoll[ i ] = picX
        else if( there is a short-term reference picture picY in the DPB
                with PicOrderCntVal equal to PocLtFoll[ i ]
                andisnotincludedinanyofRefPicSetStCurrBefore,
                RefPicSetStCurrAfterandRefPicSetStFoll)
            RefPicSetLtFoll[ i ] = picY
        else
            RefPicSetLtFoll[ i ] = "no reference picture"
    }
}
```

4. All reference pictures included in RefPicSetLtCurr and RefPicSetLtFoll are marked as "used for long-term reference"

5. All reference pictures in the decoded picture buffer that are not included in RefPicSetLtCurr, RefPicSetLtFoll, RefPicSetStCurrBefore, RefPicSetStCurrAfter or RefPicSetStFoll are marked as "unused for reference".

There may be one or more reference pictures that are included in the reference picture set but not present in the decoded picture buffer. Entries in RefPicSetStFoll or RefPicSetLtFoll that are equal to "no reference picture" should be ignored. Unless either of the following two conditions is true, an unintentional picture loss should be inferred for each entry in RefPicSetStCurrBefore, RefPicSetStCurrAfter and RefPicSetLtCurr that is equal to "no reference picture": a) the first coded picture in the bitstream is a CRA picture and the current coded picture is a TFD picture associated with the first coded picture in the bitstream; and b) the previous RAP picture preceding the current coded picture in decoding order is a BLA picture and the current coded picture is a TFD picture associated with the BLA picture.

Thus, in accordance with the techniques of this disclosure, a video coder (e.g., video encoder 20 and/or video decoder 30) may calculate MSB cycle values for pictures having different LSB values using differential coding. In addition, the video coder may code a current picture relative to one of the long-term reference pictures, e.g., picture i–1 or picture i, using the values representative of the MSB cycles. For example, the video coder may determine the POC values for reference pictures using the formula described above (formula 7-37) and/or the algorithm described above.

Video encoder 20 and video decoder 30, therefore, represent examples of a video coder configured to code a first value representative of a difference between a base most significant bits (MSBs) value of a picture order count (POC) value of a current picture of video data and a first MSBs value of a first POC value of a first long-term reference picture of the video data, code a second value representative of a difference between a second MSBs value of a second POC value of a second long-term reference picture of the video data and the first MSBs value, wherein the first POC value and the second POC value have different least significant bits (LSBs) values, and code at least a portion of a current picture of the video data relative to at least one of the first long-term reference picture using the first value and the second long-term reference picture using the first value and the second value.

Video encoder 20, for example, may determine whether there are two or more long-term reference pictures, for a current picture, for which MSB cycle values (also referred to as MSBs values) are to be signaled, even when the long-term reference pictures have different LSB values. In the event that there are two (or more) long-term reference pictures having different LSB values, but for which MSB cycle values are to be signaled, video encoder 20 may encode data representative of the MSB cycle value for the second long-term reference picture as a difference (or delta) relative to the MSB cycle value for the first long-term reference picture. Similarly, video encoder 20 may encode data representative of the MSB cycle value for the first long-term reference picture as a difference relative to a base MSB value of a POC value for the current picture. Video encoder 20 may further encode at least a portion of the current picture (e.g., one or more blocks) relative to at least one of the first long-term reference picture and the second long-term reference picture.

Thus, when video decoder 30 receives data indicative of MSB cycle values for long-term reference pictures, video decoder 30 may decode a value representative of the difference between the base MSBs of a POC value for the first long-term reference picture, and calculate the MSBs of the POC value for the first long-term reference picture by adding the value to the base MSBs. Video decoder 30 may also decode a value representative of the difference between the MSBs of a POC value for the second long-term reference picture and the MSBs of the POC value for the first long-term reference picture, and calculate the MSBs of the POC value for the second long-term reference picture by adding the value to the MSBs of the POC value for the first long-term reference picture. Likewise, video decoder 30 may decode at least a portion of the current picture relative to at least one of the first long-term reference picture and the second long-term reference picture, using the MSBs of the POC values for the long-term reference pictures.

Video encoder 20 and video decoder 30 each may be implemented as any of a variety of suitable encoder or decoder circuitry, as applicable, such as one or more microprocessors, digital signal processors (DSPs), application specific integrated circuits (ASICs), field programmable gate arrays (FPGAs), discrete logic circuitry, software, hardware, firmware or any combinations thereof. Each of video encoder 20 and video decoder 30 may be included in one or more encoders or decoders, either of which may be integrated as part of a combined video encoder/decoder (CODEC). A device including video encoder 20 and/or video decoder 30 may comprise an integrated circuit, a microprocessor, and/or a wireless communication device, such as a cellular telephone.

Figure 2:
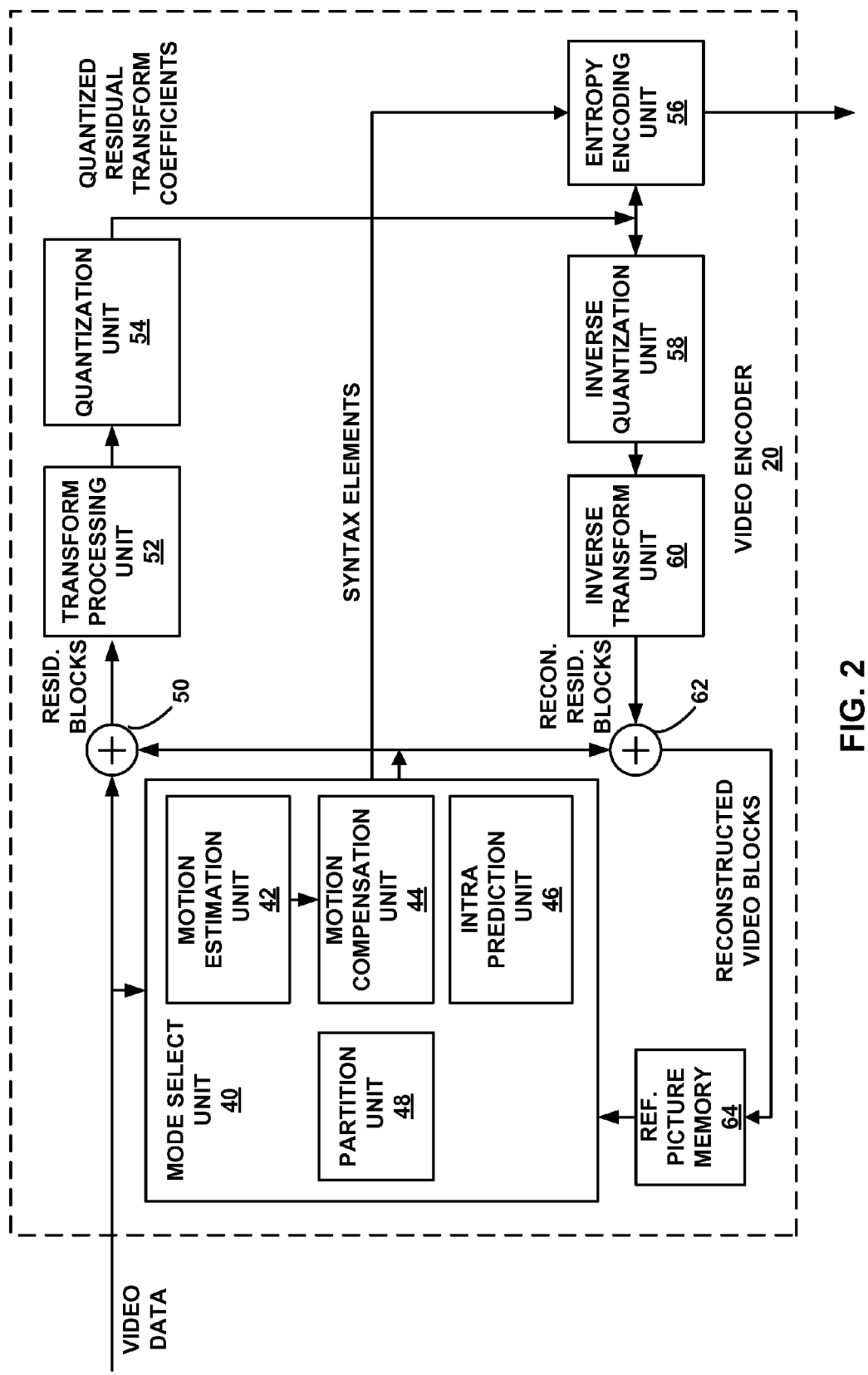
FIG. 2 is a block diagram illustrating an example of a video encoder that may implement techniques for improved signaling of long-term reference pictures in slice headers.

FIG. 2 is a block diagram illustrating an example of video encoder 20 that may implement techniques for improved signaling of long-term reference pictures in slice headers. Video encoder 20 may perform intra- and inter-coding of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based coding modes. Inter-modes, such as uni-directional prediction (P mode) or bi-prediction (B mode), may refer to any of several temporal-based coding modes.

As shown in FIG. 2, video encoder 20 receives a current video block within a video frame to be encoded. In the example of FIG. 2, video encoder 20 includes mode select unit 40, reference picture memory 64, summer 50, transform processing unit 52, quantization unit 54, and entropy encoding unit 56. Mode select unit 40, in turn, includes motion compensation unit 44, motion estimation unit 42, intra-prediction unit 46, and partition unit 48. For video block reconstruction, video encoder 20 also includes inverse quantization unit 58, inverse transform unit 60, and summer 62. A deblocking filter (not shown in FIG. 2) may also be included to filter block boundaries to remove blockiness artifacts from reconstructed video. If desired, the deblocking filter would typically filter the output of summer 62. Additional filters (in loop or post loop) may also be used in addition to the deblocking filter. Such filters are not shown for brevity, but if desired, may filter the output of summer 50 (as an in-loop filter).

During the encoding process, video encoder 20 receives a video frame or slice to be coded. The frame or slice may be divided into multiple video blocks. Motion estimation unit 42 and motion compensation unit 44 perform inter-predictive coding of the received video block relative to one or more blocks in one or more reference frames to provide temporal prediction. Intra-prediction unit 46 may alternatively perform intra-predictive coding of the received video block relative to one or more neighboring blocks in the same frame or slice as the block to be coded to provide spatial prediction. Video encoder 20 may perform multiple coding passes, e.g., to select an appropriate coding mode for each block of video data.

Moreover, partition unit 48 may partition blocks of video data into sub-blocks, based on evaluation of previous partitioning schemes in previous coding passes. For example, partition unit 48 may initially partition a frame or slice into LCUs, and partition each of the LCUs into sub-CUs based on rate-distortion analysis (e.g., rate-distortion optimization). Mode select unit 40 may further produce a quadtree data structure indicative of partitioning of an LCU into sub-CUs. Leaf-node CUs of the quadtree may include one or more PUs and one or more TUs.

Mode select unit 40 may select one of the coding modes, intra or inter, e.g., based on error results, and provides the resulting intra- or inter-coded block to summer 50 to generate residual block data and to summer 62 to reconstruct the encoded block for use as a reference frame. Mode select unit 40 also provides syntax elements, such as motion vectors, intra-mode indicators, partition information, and other such syntax information, to entropy encoding unit 56. In accordance with the techniques of this disclosure, mode select unit 40 may provide reference picture identifying information, such as whether reference picture should be treated as long-term reference pictures or short-term reference pictures, as well as least significant bits (LSBs) of picture order count (POC) values for long-term reference pictures, to entropy encoding unit 56. Entropy encoding unit 56, or another unit of video encoder 20, may include such reference picture identifying information in a slice header of a slice, in accordance with the techniques of this disclosure. Alternatively, entropy encoding unit 56 may include the reference picture identifying information (e.g., to indicate which reference pictures are long-term reference pictures) in a parameter set, such as a picture parameter set (PPS) or a sequence parameter set (SPS).

As explained above, long-term reference pictures may signaled using LSBs of POC values for the long-term reference pictures. For instance, entropy encoding unit 56 may indicate that a reference picture is a long-term reference picture by signaling the LSBs of the POC value for the reference picture in a slice header, a PPS, or an SPS. Other reference pictures that are not signaled in this manner may be treated as short-term reference pictures.

By signaling identifying information for long-term reference pictures, entropy encoding unit 56 provides data indicating which reference pictures are to be stored in a decoded picture buffer (DPB) of a video decoder (e.g., video decoder 30) for a relatively long term period of time, and which reference pictures can be removed from the decoded picture buffer earlier. In general, long-term reference pictures may be used as reference pictures for coding pictures having relatively late decoding order times. Thus, signaling the identifying information for the long-term reference pictures provides information for a video decoder, e.g., video decoder 30, such that the video decoder can determine whether or not a reference picture can be discarded from its own DPB.

Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference frame (or other coded unit) relative to the current block being coded within the current frame (or other coded unit). A predictive block is a block that is found to closely match the block to be coded, in terms of pixel difference, which may be determined by sum of absolute difference (SAD), sum of square difference (SSD), or other difference metrics. In some examples, video encoder 20 may calculate values for sub-integer pixel positions of reference pictures stored in reference picture memory 64. For example, video encoder 20 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in reference picture memory 64. Reference picture memory 64 may store both long-term and short-term reference pictures. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation unit 42. Again, motion estimation unit 42 and motion compensation unit 44 may be functionally integrated, in some examples. Upon receiving the motion vector for the PU of the current video block, motion compensation unit 44 may locate the predictive block to which the motion vector points in one of the reference picture lists. Summer 50 forms a residual video block by subtracting pixel values of the predictive block from the pixel values of the current video block being coded, forming pixel difference values, as discussed below. In general, motion estimation unit 42 performs motion estimation relative to luma components, and motion compensation unit 44 uses motion vectors calculated based on the luma components for both chroma components and luma components.

Mode select unit 40 may also generate syntax elements associated with the video blocks and the video slice for use by video decoder 30 in decoding the video blocks of the video slice. For example, after calculating a motion vector for a block of video data (where the motion vector points to a reference block in a reference picture), mode select unit 40 may generate values for motion parameters, such as a reference picture list in which the reference picture is stored and an index into the reference picture list that corresponds to the position of the reference picture in the reference picture list. These and other motion parameters may be coded based on a motion vector coding mode. For example, using advanced motion vector prediction (AMVP), entropy encoding unit 56 may identify a motion vector predictor (corresponding to a spatial or temporal neighbor to the current block), and explicitly signal the reference picture list, reference picture index, and horizontal and vertical motion vector difference values. As another example, using merge mode, entropy encoding unit 56 may identify a motion vector predictor using a merge index, and the reference picture list and reference index may be inherited from the motion vector predictor (e.g., the motion information of a neighboring block, whether a spatial neighbor or a temporal neighbor).

Video encoder 20 signals information indicative of which reference pictures are long-term reference pictures both to indicate that these pictures are not to be discarded from the DPB and to provide information that may be used during a reference picture list construction process. In this manner, a video decoder, such as video decoder 30, may be capable of accurately reproducing the reference picture list, such that the reference index used as motion information for an inter-predicted block accurately refers to the correct reference picture.

As noted above, long-term reference pictures may be signaled using POC values of the long-term reference pictures. POC values generally correspond to data indicative of display order (also referred to as output order) of pictures, which is not necessarily the same as decoding order (also referred to as bitstream order). POC values for long-term reference pictures may be signaled using only the least significant bits (LSBs). Data representative of MSBs may occasionally be signaled, e.g., when two or more long-term reference pictures have the same LSBs. In some instances, video encoder 20 may determine that data representative of MSBs for two (or more) pictures needs to be signaled, even when at least two of the pictures for which the MSBs data are signaled have different LSBs.

In accordance with the techniques of this disclosure, video encoder 20 may signal the data representative of the MSBs as a difference, e.g., the difference between one set of MSBs and another set of MSBs. For instance, as discussed above with respect to Table 1, video encoder 20 may calculate the difference between a base MSBs value and the MSBs value for a long-term reference picture. Entropy encoding unit 56 may signal this difference as a value representative of the MSBs for the long-term reference picture. The base MSBs value may correspond to the MSBs of the POC value of a current picture. Alternatively, the base MSBs value may correspond to the MSBs of the POC value of another picture, such as an instantaneous decoder refresh (IDR) picture.

After encoding the difference value for one long-term reference picture, entropy encoding unit 56 may calculate the difference between MSBs of the POC value for another long-term reference picture and the MSBs of the POC value for the earlier long-term reference picture. Likewise, entropy encoding unit 56 may signal this second difference value for the subsequent long-term reference picture, so that a video decoder, such as video decoder 30, can reconstruct the MSBs of the POC value for the subsequent long-term reference picture. In this manner, video encoder 20 may be configured to encode data representative of MSBs of POC values for long-term reference pictures as a difference values, e.g., relative to a base MSBs value or relative to previously encoded MSBs for POC values of other long-term reference pictures. Moreover, video encoder 20 may signal these difference values even when the LSBs of the POC values are different.

As discussed above, in some examples, video encoder 20 may be configured to encode negative integer values for difference values representing differences between MSBs of POC values for one or more long-term reference pictures and a base MSBs value (or other reference MSBs). For instance, when entropy encoding unit 56 (or another unit of video encoder 20) determines that a current picture has a POC value equal to MaxPicOrderCntLsb*N−1, and that a picture that has a POC value equal to MaxPicOrderCntLsb*N is the first LTRP for which the delta_poc_msb_cycle_lt[i] is signalled, entropy encoding unit 56 may code a value of −1 for the MSBs of the POC value of the LTRP.

In addition, or in the alternative, video encoder 20 may be configured to encode data representative of POC values for long-term reference pictures based at least in part on a total number of reference pictures currently stored in a reference picture set (or a decoded picture buffer) and/or a number of short-term reference pictures currently stored in the reference picture set (or the decoded picture buffer). For instance, video encoder 20 may be configured to determine whether to signal a POC MSB cycle value for a long-term reference picture based on whether there are any other long-term reference pictures in the reference picture set (or decoded picture buffer) that have the same POC LSBs value as the long-term reference picture. Thus, when there are only one or more short-term reference pictures in the reference picture set having the same POC LSBs as the long-term reference picture, video encoder 20 may avoid encoding a POC MSB cycle value for the long-term reference picture.

In addition, or in the alternative, video encoder 20 may determine not to code a delta POC MSB cycle value for a long-term reference picture when there are N long-term reference pictures in the decoded picture buffer that have the same LSBs as the POC value for the long-term reference picture and when video encoder 20 has already encoded delta POC MSB cycle values for N−1 of the long-term reference pictures.

Intra-prediction unit 46 may intra-predict a current block, as an alternative to the inter-prediction performed by motion estimation unit 42 and motion compensation unit 44, as described above. In particular, intra-prediction unit 46 may determine an intra-prediction mode to use to encode a current block. In some examples, intra-prediction unit 46 may encode a current block using various intra-prediction modes, e.g., during separate encoding passes, and intra-prediction unit 46 (or mode select unit 40, in some examples) may select an appropriate intra-prediction mode to use from the tested modes.

For example, intra-prediction unit 46 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bitrate (that is, a number of bits) used to produce the encoded block. Intra-prediction unit 46 may calculate ratios from the distortions and rates for the various encoded blocks to determine which intra-prediction mode exhibits the best rate-distortion value for the block.

After selecting an intra-prediction mode for a block, intra-prediction unit 46 may provide information indicative of the selected intra-prediction mode for the block to entropy encoding unit 56. Entropy encoding unit 56 may encode the information indicating the selected intra-prediction mode. Video encoder 20 may include in the transmitted bitstream configuration data, which may include a plurality of intra-prediction mode index tables and a plurality of modified intra-prediction mode index tables (also referred to as codeword mapping tables), definitions of encoding contexts for various blocks, and indications of a most probable intra-prediction mode, an intra-prediction mode index table, and a modified intra-prediction mode index table to use for each of the contexts.

Video encoder 20 forms a residual video block by subtracting the prediction data from mode select unit 40 from the original video block being coded. Summer 50 represents the component or components that perform this subtraction operation. Transform processing unit 52 applies a transform, such as a discrete cosine transform (DCT) or a conceptually similar transform, to the residual block, producing a video block comprising residual transform coefficient values. Transform processing unit 52 may perform other transforms which are conceptually similar to DCT. Wavelet transforms, integer transforms, sub-band transforms or other types of transforms could also be used. In any case, transform processing unit 52 applies the transform to the residual block, producing a block of residual transform coefficients. The transform may convert the residual information from a pixel value domain to a transform domain, such as a frequency domain. Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy encoding unit 56 entropy codes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy coding technique. In the case of context-based entropy coding, context may be based on neighboring blocks. Following the entropy coding by entropy encoding unit 56, the encoded bitstream may be transmitted to another device (e.g., video decoder 30) or archived for later transmission or retrieval.

Inverse quantization unit 58 and inverse transform unit 60 apply inverse quantization and inverse transformation, respectively, to reconstruct the residual block in the pixel domain, e.g., for later use as a reference block. Motion compensation unit 44 may calculate a reference block by adding the residual block to a predictive block of one of the frames of reference picture memory 64. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reconstructed video block for storage in reference picture memory 64. The reconstructed video block may be used by motion estimation unit 42 and motion compensation unit 44 as a reference block to inter-code a block in a subsequent video frame.

Video encoder 20 of FIG. 2 represents an example of a video encoder that can be configured to code data for a current picture of video data, wherein the coded data represents a negative integer value for a picture order count (POC) most significant bits (MSB) cycle for a long-term reference picture for the current picture, and code at least a portion of the current picture relative to the long-term reference picture based at least in part on the negative integer value for the MSB cycle.

Video encoder 20 of FIG. 2 also represents an example of a video encoder that can be, additionally or alternatively, configured to encode at least a first portion of a current picture of video data relative to a first long-term reference picture and at least a second portion of the current picture to a second long-term reference picture, encode a first value representative of a difference between a base most significant bits (MSBs) value of a picture order count (POC) value of a current picture of the video data and a first MSBs value of a first POC value of the first long-term reference picture of the video data, and encode a second value representative of a difference between a second MSBs value of a second POC value of the second long-term reference picture of the video data and the first MSBs value, wherein the first POC value and the second POC value have different least significant bits (LSBs) values.

Video encoder 20 of FIG. 2 also represents an example of a video encoder that can be, additionally or alternatively, configured to determine a number of reference pictures marked as short-term reference pictures, out of a total number of available reference pictures, for a current picture, code a most significant bits (MSB) value for long-term reference pictures for the current picture based on the total number of reference pictures and the number of reference pictures marked as short-term reference pictures, and code at least a portion of the current picture relative to at least one of the available reference pictures.

Video encoder 20 of FIG. 2 also represents an example of a video encoder that can be, additionally or alternatively, configured to determine a number N of reference pictures for a current picture that have picture order count (POC) values with equal least significant bit (LSB) values, determine that the reference picture set of the current picture may include N long-term reference pictures, and code delta POC most significant bit (MSB) cycle values for at most N−1 of the long-term reference pictures based on the determinations.

Figure 3:
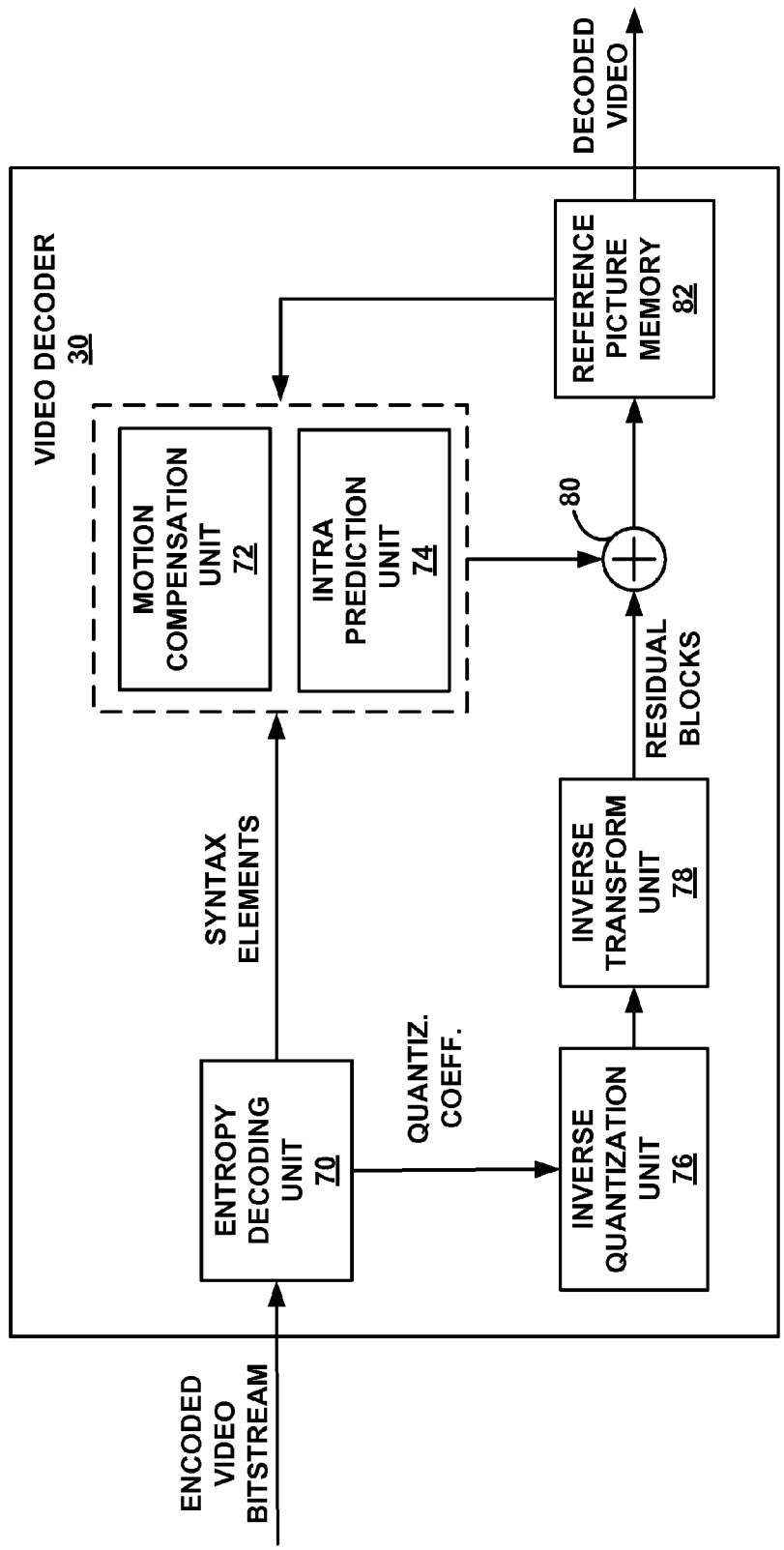
FIG. 3 is a block diagram illustrating an example of a video decoder that may implement techniques for improved signaling of long-term reference pictures in slice headers.

FIG. 3 is a block diagram illustrating an example of video decoder 30 that may implement techniques for improved signaling of long-term reference pictures in slice headers. In the example of FIG. 3, video decoder 30 includes an entropy decoding unit 70, motion compensation unit 72, intra prediction unit 74, inverse quantization unit 76, inverse transformation unit 78, reference picture memory 82 and summer 80. Video decoder 30 may, in some examples, perform a decoding pass generally reciprocal to the encoding pass described with respect to video encoder 20 (FIG. 2). Motion compensation unit 72 may generate prediction data based on motion vectors received from entropy decoding unit 70, while intra-prediction unit 74 may generate prediction data based on intra-prediction mode indicators received from entropy decoding unit 70.

During the decoding process, video decoder 30 receives an encoded video bitstream that represents video blocks of an encoded video slice and associated syntax elements from video encoder 20. Entropy decoding unit 70 of video decoder 30 entropy decodes the bitstream to generate quantized coefficients, motion vectors or intra-prediction mode indicators, and other syntax elements. Entropy decoding unit 70 forwards the motion vectors to and other syntax elements to motion compensation unit 72. Video decoder 30 may receive the syntax elements at the video slice level and/or the video block level.

When the video slice is coded as an intra-coded (I) slice, intra prediction unit 74 may generate prediction data for a video block of the current video slice based on a signaled intra prediction mode and data from previously decoded blocks of the current frame or picture. When the video frame is coded as an inter-coded (i.e., B, P or GPB) slice, motion compensation unit 72 produces predictive blocks for a video block of the current video slice based on the motion vectors and other syntax elements received from entropy decoding unit 70. The predictive blocks may be produced from one of the reference pictures within one of the reference picture lists. Video decoder 30 may construct the reference picture lists, List 0 and List 1, using default construction techniques based on reference pictures stored in reference picture memory 82.

Video decoder 30 may determine a reference picture set, from which video decoder 30 constructs the reference picture lists. In some examples, e.g., when video decoder 30 conforms to HEVC, video decoder 30 may construct the reference picture lists in accordance with Section 8.3.3 of HEVC WD7. The reference picture set generally corresponds to reference pictures currently stored in a decoded picture buffer, e.g., within reference picture memory 82. Certain reference pictures of the reference picture set may be marked as short-term reference pictures, while other reference pictures of the reference picture set may be marked as long-term reference pictures. In general, a long-term reference picture is marked as "used for long-term reference," e.g., in a network abstraction layer (NAL) unit header of a NAL unit that encapsulates coded video data for the reference picture.

In accordance with the techniques of this disclosure, video decoder 30 may be configured to decode identifiers for long-term reference pictures using differential coding. For instance, for a first long-term reference picture (e.g., a long-term reference picture having an index value of 0 in a sequence of pictures), video decoder 30 may decode a difference value indicative of a difference between POC MSBs for the long-term reference picture and POC MSBs for a current picture. The POC MSBs for the current picture may be referred to as "base MSBs." For other long-term reference pictures (e.g., long-term reference pictures having an index value greater than 0 in the sequence of pictures), video decoder 30 may decode a difference value indicative of a difference between POC MSBs for the long-term reference picture and POC MSBs for a previous long-term reference picture. Assuming that the long-term reference picture for which POC MSBs are currently being determined has an index value of i, video decoder 30 may refer to the POC MSBs of the long-term reference picture having an index value of any value between 0 and i−1, inclusive, to determine the POC MSBs. That is, video decoder 30 may refer to the POC MSBs of a long-term reference picture having an index value of j, where j is between 0 and i−1, inclusive. The difference value may, in some instances, have a negative integer value.

After receiving a difference value that describes the difference between the POC MSBs for a long-term reference picture, video decoder 30 may determine a POC MSBs value to which the difference value applies (that is, to which the difference value is to be added to reconstruct the POC MSBs for the long-term reference picture). For instance, if the long-term reference picture has an index value of 0 (indicating that the long-term reference picture is the ordinal first long-term reference picture in a sequence of pictures), video decoder 30 may use the POC MSBs value of the current picture as a base MSBs value, and add the difference value signaled for the long-term reference picture to the base MSBs value. As another example, if the long-term reference picture has an index value greater than 0 (indicating that the long-term reference picture is not the ordinal first long-term reference picture in the sequence of pictures), assuming that the index value is i, video decoder 30 may add the signaled difference value to the POC MSBs for the long-term reference picture having index value i−1.

In this manner, video decoder 30 may decode a first value representative of a difference between a base most significant bits (MSBs) value of a picture order count (POC) value of a current picture of video data and a first MSBs value of a first POC value of a first long-term reference picture of the video data, and decode a second value representative of a difference between a second MSBs value of a second POC value of a second long-term reference picture of the video data and the first MSBs value, wherein the first POC value and the second POC value have different least significant bits (LSBs) values. Likewise, video decoder 30 may calculate a first MSB cycle value for the first long-term reference picture as DeltaPoc-MSBCycleLt[i−1] using the first value (that is, the first difference value), and calculate a second MSB cycle value for the second long-term reference picture as DeltaPocMSBCycleLt[i], wherein calculating the second MSB cycle value comprises calculating DeltaPocMSBCycleLt[i] based on DeltaPocMSBCycleLt[i−1] and the second value (that is, the second difference value).

In addition, video decoder 30 may decode LSBs for the POC values of the long-term reference pictures. The LSBs may be signaled in a slice header of a slice for the current picture, a sequence parameter set (SPS) for a sequence including the current picture, a picture parameter set (PPS) for the current picture, or elsewhere. Video decoder 30 may concatenate the MSBs and the LSBs for the POC value of a long-term reference picture to determine the full POC value of the long-term reference picture. Then, video decoder 30 may assemble a reference picture list including the long-term reference pictures identified by POC value. In this manner, video decoder 30 can use motion information (e.g., data that identifies a reference picture list and a reference index) to perform inter-prediction. For example, as explained below, motion compensation unit 72 may determine a reference block for a block of a current picture based at least in part on motion information that identifies a reference picture, corresponding to one of the pictures in one of the reference picture lists. The reference picture may correspond to one of the long-term reference pictures, or to a short-term reference picture.

Motion compensation unit 72 determines prediction information for a video block of the current video slice by parsing the motion vectors and other syntax elements, and uses the prediction information to produce the predictive blocks for the current video block being decoded. For example, motion compensation unit 72 uses some of the received syntax elements to determine a prediction mode (e.g., intra- or inter-prediction) used to code the video blocks of the video slice, an inter-prediction slice type (e.g., B slice, P slice, or GPB slice), construction information for one or more of the reference picture lists for the slice, motion vectors for each inter-encoded video block of the slice, inter-prediction status for each inter-coded video block of the slice, and other information to decode the video blocks in the current video slice.

Motion compensation unit 72 may also perform interpolation based on interpolation filters. Motion compensation unit 72 may use interpolation filters as used by video encoder 20 during encoding of the video blocks to calculate interpolated values for sub-integer pixels of reference blocks. In this case, motion compensation unit 72 may determine the interpolation filters used by video encoder 20 from the received syntax elements and use the interpolation filters to produce predictive blocks.

Inverse quantization unit 76 inverse quantizes, i.e., de-quantizes, the quantized transform coefficients provided in the bitstream and decoded by entropy decoding unit 70. The inverse quantization process may include use of a quantization parameter QPY calculated by video decoder 30 for each video block in the video slice to determine a degree of quantization and, likewise, a degree of inverse quantization that should be applied. Inverse transform unit 78 applies an inverse transform, e.g., an inverse DCT, an inverse integer transform, or a conceptually similar inverse transform process, to the transform coefficients in order to produce residual blocks in the pixel domain.

After motion compensation unit 72 generates the predictive block for the current video block based on the motion vectors and other syntax elements, video decoder 30 forms a decoded video block by summing the residual blocks from inverse transform unit 78 with the corresponding predictive blocks generated by motion compensation unit 72. Summer 80 represents the component or components that perform this summation operation. If desired, a deblocking filter may also be applied to filter the decoded blocks in order to remove blockiness artifacts. Other loop filters (either in the coding loop or after the coding loop) may also be used to smooth pixel transitions, or otherwise improve the video quality. The decoded video blocks in a given frame or picture are then stored in reference picture memory 82, which stores reference pictures used for subsequent motion compensation. Reference picture memory 82 also stores decoded video for later presentation on a display device, such as display device 32 of FIG. 1.

In this manner, video decoder 30 of FIG. 3 represents an example of a video decoder that can be configured to decode a first value representative of a difference between a base most significant bits (MSBs) value of a picture order count (POC) value of a current picture of video data and a first MSBs value of a first POC value of a first long-term reference picture of the video data, decode a second value representative of a difference between a second MSBs value of a second POC value of a second long-term reference picture of the video data and the first MSBs value, wherein the first POC value and the second POC value have different least significant bits (LSBs) values, and decode at least a portion of a current picture of the video data relative to at least one of the first long-term reference picture using the first value and the second long-term reference picture using the first value and the second value.

Video decoder 30 of FIG. 3 also represents an example of a video decoder that can be, additionally or alternatively, configured to decode data for a current picture of video data, wherein the decoded data represents a negative integer value for a picture order count (POC) most significant bits (MSB) cycle for a long-term reference picture relative for the current picture, and decode at least a portion of the current picture relative to the long-term reference picture based at least in part on the negative integer value for the MSB cycle.

Video decoder 30 of FIG. 3 also represents an example of a video decoder that can be, additionally or alternatively, configured to determine a number of reference pictures marked as short-term reference pictures, out of a total number of available reference pictures, for a current picture, decode a most significant bits (MSB) value for long-term reference pictures for the current picture based on the total number of reference pictures and the number of reference pictures marked as short-term reference pictures, and decode at least a portion of the current picture relative to at least one of the available reference pictures.

Video decoder 30 of FIG. 3 also represents an example of a video decoder that can be, additionally or alternatively, configured to determine a number N of reference pictures for a current picture that have picture order count (POC) values with equal least significant bit (LSB) values, determine that the reference picture set may include N long-term reference pictures, and decode delta POC most significant bit (MSB) cycle values for at most N−1 of the long-term reference pictures based on the determinations.

Figure 4:
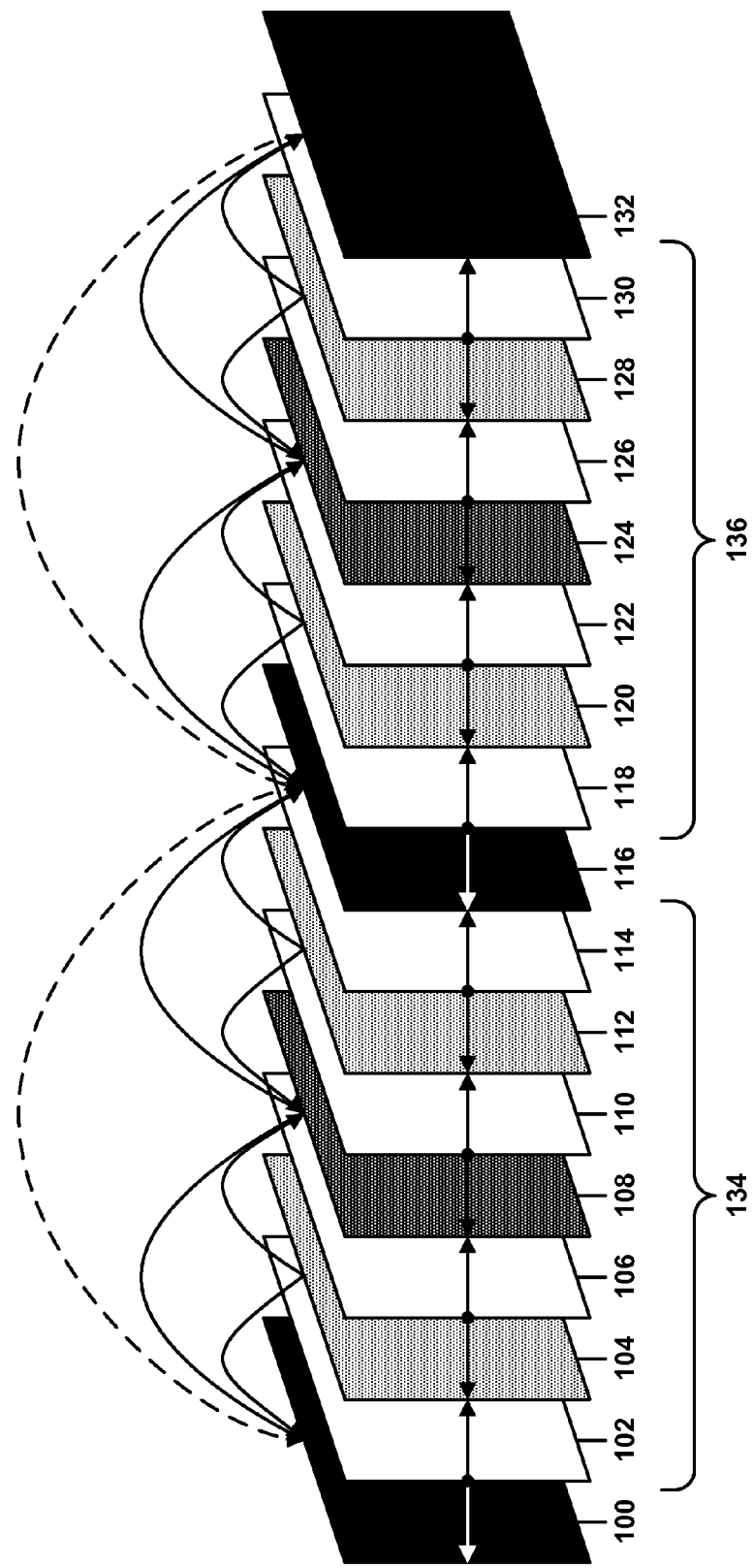
FIG. 4 is a conceptual diagram illustrating a sequence of coded video pictures.

FIG. 4 is a conceptual diagram illustrating a sequence of coded video pictures 100-132. The pictures are shaded differently to indicate positions within a hierarchical prediction structure. For example, pictures 100, 116, and 132 are shaded black to represent that pictures 100, 116, 132 are at the top of the hierarchical prediction structure. Pictures 100, 116, 132 may comprise, for example, intra-coded pictures or inter-coded pictures that are predicted from other pictures in a single direction (e.g., P-pictures). When intra-coded, pictures 100, 116, 132 are predicted solely from data within the same picture. When inter-coded, picture 116, for example, may be coded relative to data of picture 100, as indicated by the dashed arrow from picture 116 to picture 100. Pictures 116, 132 form key pictures of groups of pictures (GOPs) 134, 136, respectively.

Pictures 108, 124 are darkly shaded to indicate that they are next in the encoding hierarchy following pictures 100, 116, and 132. Pictures 108, 124 may comprise bi-directional, inter-mode prediction encoded pictures. For example, picture 108 may be predicted from data of pictures 100 and 116, while picture 124 may be predicted from pictures 116 and 132. Pictures 104, 112, 120, and 128 are lightly shaded to indicate that they are next in the encoding hierarchy following pictures 108 and 124. Pictures 104, 112, 120, and 128 may also comprise bi-directional, inter-mode prediction encoded pictures. For example, picture 104 may be predicted from pictures 100 and 108, picture 112 may be predicted from pictures 108 and 116, picture 120 may be predicted from picture 116 and 124, and picture 128 may be predicted from picture 124 and 132. In general, pictures that are lower in the hierarchy may be encoded from any reference pictures that are higher in the hierarchy, assuming that the reference pictures are still buffered in a decoded picture buffer, and assuming that the reference pictures were coded earlier than the picture currently being coded.

Finally, pictures 102, 106, 110, 114, 118, 122, 126, and 130 are shaded white to indicate that these pictures are last in the encoding hierarchy. Pictures 102, 106, 110, 114, 118, 122, 126, and 130 may be bi-directional, inter-mode prediction encoded pictures. Picture 102 may be predicted from pictures 100 and 104, picture 106 may be predicted from pictures 104 and 108, picture 110 may be predicted from pictures 108 and 112, picture 114 may be predicted from pictures 112 and 116, picture 118 may be predicted from picture 116 and 120, picture 122 may be predicted from pictures 120 and 124, picture 126 may be predicted from pictures 124 and 128, and picture 130 may be predicted from pictures 128 and 132. Again, it should be understood that pictures lower in the coding hierarchy may be coded from other pictures that are higher in the coding hierarchy. For example, any or all of pictures 102, 106, 110, or 114 may be predicted relative to any of pictures 100, 116, or 108, in addition or in the alternative.

Pictures 100-132 are illustrated in display order. That is, following decoding, picture 100 is displayed before picture 102, picture 102 is displayed before picture 104, and so on. As discussed above, POC values generally describe a display order for pictures, which is also substantially the same as the order in which raw pictures were captured or generated prior to being encoded. However, due to the encoding hierarchy, pictures 100-132 may be decoded in a different order. Moreover, while being encoded, pictures 100-132 may be arranged in decoding order in a bitstream including encoded data for pictures 100-132. For example, picture 116 may be displayed last among pictures of GOP 134. However, due to the encoding hierarchy, picture 116 may be decoded first of GOP 134. That is, in order to properly decode picture 108, for example, picture 116 may need to be decoded first, in order to act as a reference picture for picture 108. Likewise, picture 108 may act as a reference picture for pictures 104, 106, 110, and 112, and therefore may need to be decoded before pictures 104, 106, 110, and 112.

Furthermore, certain pictures may be treated as long-term reference pictures, while other pictures may be treated as short-term reference pictures. Suppose, for example, that pictures 100 and 116 represent long-term reference pictures, while pictures 108, 104, and 112 represent short-term reference pictures. It may be the case, in this example, that pictures 102 and 106 may be predicted relative to any of pictures 100, 116, 108, or 104, but that pictures 110 and 114 may be predicted relative to any of pictures 100, 116, 108, or 112. In other words, picture 104 may not be available for reference when coding pictures 110 and 114. As another example, assuming that pictures 100 and 116 represent long-term reference pictures and pictures 108, 104, and 112 represent short-term reference pictures, pictures 108, 104, and 112 may not be available for reference when coding pictures 118, 122, 126, and 130.

In accordance with the techniques of this disclosure, data regarding long-term reference pictures may be signaled in slice headers of slices for any or all of pictures 100-132. Alternatively, the data may be signaled in PPSs, SPSs, or other data structures.

Assuming again that pictures 100 and 116 represent long-term reference pictures, video encoder 20 may encode POC MSBs for picture 100 as a difference relative to a base MSBs value, e.g., POC MSBs of a current picture, such as picture 102. That is, video encoder 20 may calculate a difference between the POC MSBs for picture 100 and the POC MSBs for picture 102, and encode the difference value for picture 100. Likewise, video encoder 20 may calculate a difference between POC MSBs for picture 116 and the POC MSBs for picture 100, and encode the difference value for picture 116. Video encoder 20 may also encode LSBs values for pictures 100 and 116.

Thus, video decoder 30 may reconstruct POC values for pictures 100 and 116 by decoding the difference value for picture 100 and adding the difference value to the base MSBs value for picture 102. Likewise, video decoder 30 may decode the difference value for picture 116 and add the difference value to the POC MSBs for picture 100. Video decoder 30 may also decode POC LSBs values for pictures 100 and 116. Video decoder 30 may concatenate the POC MSBs for picture 100 with the POC LSBs for picture 100 to reproduce the POC value for picture 100. Likewise, video decoder 30 may concatenate the POC MSBs for picture 116 with the POC LSBs for picture 116 to reproduce the POC value for picture 116.

In this manner, both video encoder 20 and video decoder 30 may be configured to code a first value representative of a difference between a base most significant bits (MSBs) value of a picture order count (POC) value of a current picture of video data and a first MSBs value of a first POC value of a first long-term reference picture of the video data, code a second value representative of a difference between a second MSBs value of a second POC value of a second long-term reference picture of the video data and the first MSBs value, wherein the first POC value and the second POC value have different least significant bits (LSBs) values, and code at least a portion of a current picture of the video data relative to at least one of the first long-term reference picture using the first value and the second long-term reference picture using the first value and the second value.

More particularly, video encoder 20 may encode data representative of POC values for long-term reference pictures to be included in a reference picture list for a current picture, e.g., picture 102. In general, video encoder 20 may indicate that a reference picture should be included in a reference picture list when at least a portion of the current picture is encoded relative to the reference picture. A portion of a picture may be considered encoded relative to a reference picture when a block of the picture is inter-encoded relative to the reference picture, such that a motion vector for the block points to a reference block of the reference picture. Motion information for the block may include a reference picture list identifier (e.g., List 0 or List 1), as well as a reference index that corresponds to a reference picture in the reference picture list identified by the reference picture list identifier.

Thus, video encoder 20 may encode a block of picture 102 relative to a reference block of picture 100. That is, video encoder 20 may perform a motion search for the block and determine that the reference block of picture 100 produces an acceptable error value, relative to other reference blocks. Similarly, video encoder 20 may encode a different block of picture 102 relative to a reference block of picture 116.

Figure 5:
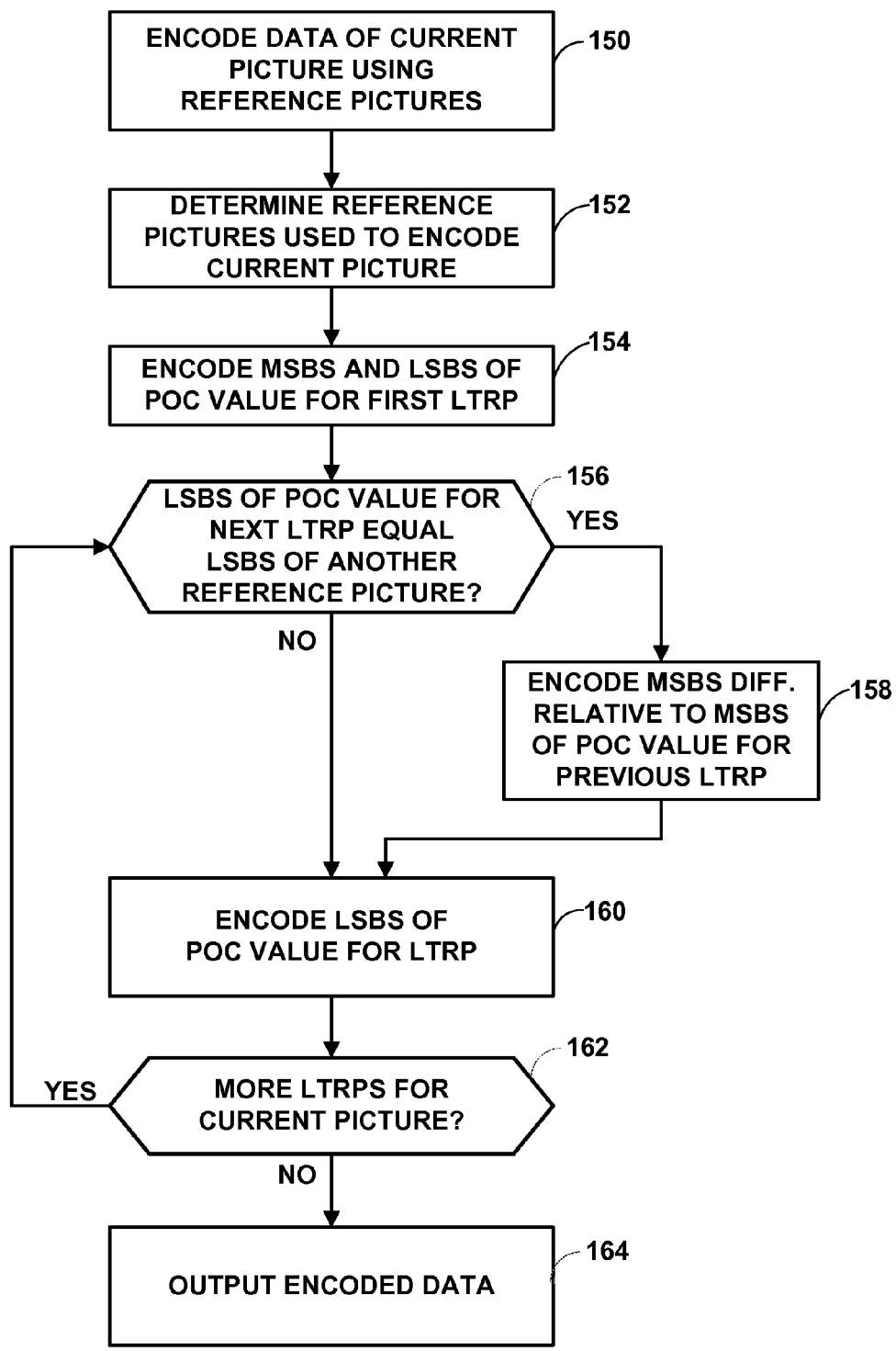
FIG. 5 is a flowchart illustrating an example method for encoding picture order count (POC) values for long-term reference pictures in accordance with the techniques of this disclosure.

FIG. 5 is a flowchart illustrating an example method for encoding POC values for long-term reference pictures in accordance with the techniques of this disclosure. For purposes of explanation, the method of FIG. 5 is explained with respect to video encoder 20 of FIGS. 1 and 2 and components thereof. However, it should be understood that other video encoding devices may be configured to perform the method of FIG. 5.

Initially, video encoder 20 may encode data of a current picture using one or more reference pictures (150). Video encoder 20 may then determine the reference pictures that were used to encode the current picture (152). More particularly, video encoder 20 may determine which reference pictures in a set of available reference pictures are actually used for reference when encoding the current picture. In some examples, steps 150 and 152 may be integrated and performed substantially simultaneously. The available reference pictures may include long-term reference pictures (LTRPs) and short-term reference pictures (STRPs). Video encoder 20 may determine whether to set a reference picture as a long-term reference picture or a short-term reference picture based on coding results obtained over a number of various trial coding passes. For instance, when coding results (e.g., rate-distortion optimization (RDO) metrics) are generally better when a particular reference picture is treated as a long-term reference picture (potentially offset by the amount of memory consumed to store the reference picture long-term), video encoder 20 may treat that reference picture as a long-term reference picture.

In any case, after determining the set of reference pictures and those reference pictures that are to be treated as long-term reference pictures, video encoder 20 may encode information that indicates which pictures are to be included in reference picture lists for the current picture as long-term reference pictures. The encoded information may comprise data representative of POC values for the long-term reference pictures. Video encoder 20 may encode this information in a slice header of a slice of the current picture, a PPS corresponding to the current picture, an SPS for a sequence including the current picture, or elsewhere.

Video encoder 20 may encode data indicative of MSBs of the POC value for an ordinal first long-term reference picture, as well as data indicative of LSBs of the POC value for the ordinal first long-term reference picture (154). To encode the MSBs, video encoder 20 may calculate a difference between the MSBs of the POC value for the first long-term reference picture and the MSBs of the POC value for the current picture, and encode this calculated difference value.

Video encoder 20 may then determine whether LSBs of a POC value for a subsequent LTRP are equal to LSBs of a POC value for another reference picture for the current picture (156). When video encoder 20 determines that LSBs of the POC value for the subsequent LTRP are equal to the LSBs of the POC value for another reference for the current picture ("YES" branch of 156), video encoder 20 may encode data representative of a difference between the MSBs of the POC value for the subsequent LTRP and the MSBs of the POC value for a previous LTRP (that is, the most recent LTRP for which the POC MSB information was encoded) (158). The LSBs of the POC value for the most recent LTRP are not necessarily the same as the LSBs of the POC value for the LTRP currently being encoded. As discussed above, to calculate the difference value, assuming that the subsequent LTRP has an index value of i, video encoder 20 may calculate the difference between the MSBs of the POC value for LTRP i and the MSBs of the POC value for LTRP j if LTRP j was the previous LTRP for which the POC MSB information was coded. Video encoder 20 may then encode the difference value. This difference value may correspond to delta_poc_msb_cycle_lt[i] (or delta_poc_msb_cycle_lt_plus1[i]).

After encoding the difference value, or when the LSBs of the POC value for the next LTRP are not equal to the LSBs of another reference picture ("NO" branch of 156), video encoder 20 may code LSBs of the POC value for the LTRP (160). Video encoder 20 may then determine whether there are more LTRPs for the current picture (162). When there are more LTRPs for the current picture ("YES" branch of 162), video encoder 20 may proceed to encode the LSBs of POC values for the remaining LTRPs, and, when necessary, the MSBs using differential coding as discussed above. However, when there are no more LTRPs for the current picture ("NO" branch of 162), video encoder 20 may output the encoded data (164), which may include encoded blocks for the current picture, encoded POC values for long-term reference pictures for the current picture (included LSBs and, when the LSBs are not unique, difference values for MSBs), and the like.

In this manner, the method of FIG. 5 represents an example of a method including encoding at least a first portion of a current picture of video data relative to a first long-term reference picture and at least a second portion of the current picture to a second long-term reference picture, encoding a first value representative of a difference between a base most significant bits (MSBs) value of a picture order count (POC) value of a current picture of the video data and a first MSBs value of a first POC value of the first long-term reference picture of the video data, and encoding a second value representative of a difference between a second MSBs value of a second POC value of the second long-term reference picture of the video data and the first MSBs value, wherein the first POC value and the second POC value have different least significant bits (LSBs) values.

Figure 6:
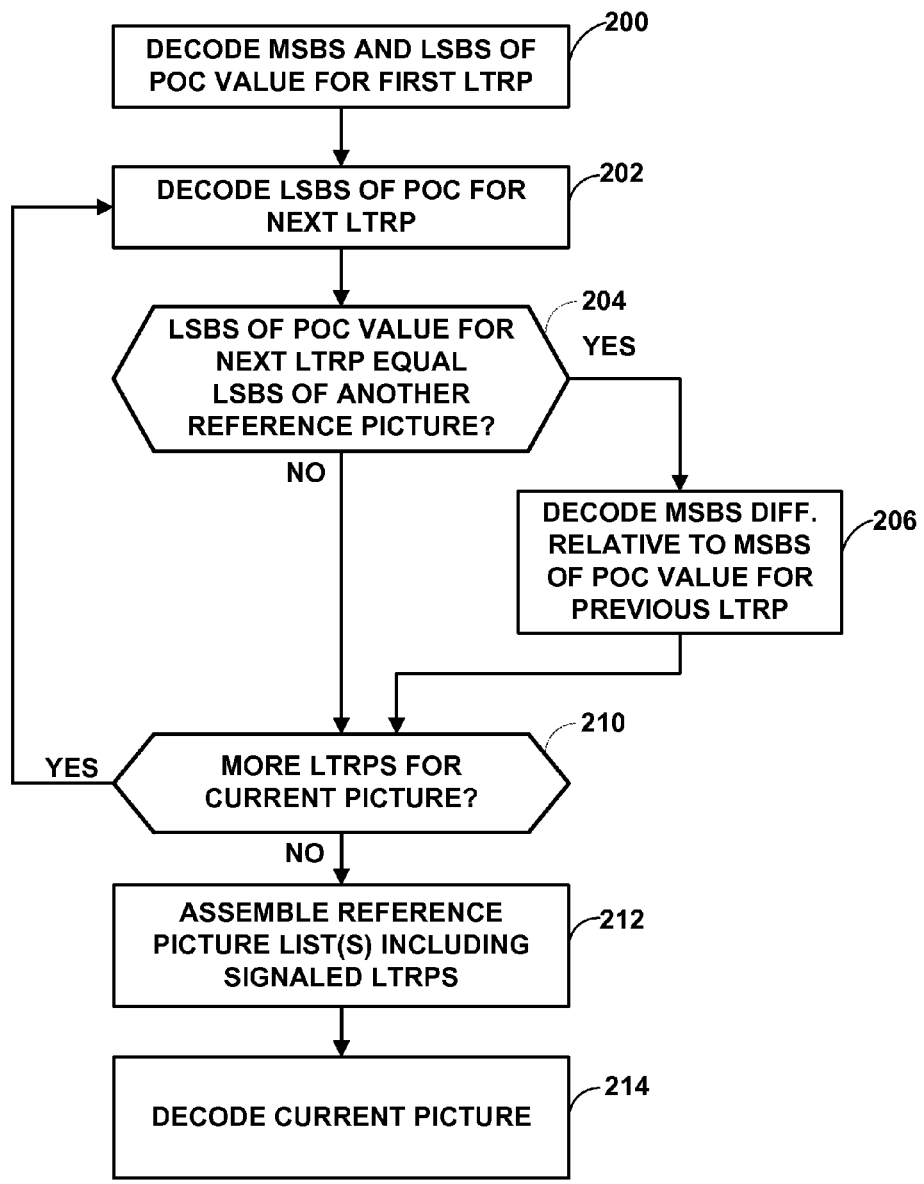
FIG. 6 is a flowchart illustrating an example method for decoding POC values for long-term reference pictures in accordance with the techniques of this disclosure.

FIG. 6 is a flowchart illustrating an example method for decoding POC values for long-term reference pictures in accordance with the techniques of this disclosure. For purposes of explanation, the method of FIG. 6 is explained with respect to video decoder 30 of FIGS. 1 and 3 and components thereof. However, it should be understood that other video decoding devices may be configured to perform the method of FIG. 6.

Initially, video decoder 30 may decode MSBs and LSBs of a POC value for an ordinal first long-term reference picture (LTRP) of a current picture (200). For example, video decoder 30 may decode a difference value representative of a difference between the MSBs of the POC value for the first LTRP and the MSBs of the POC value for the current picture. Video decoder 30 may then add the difference value to the MSBs of the POC value for the current picture, to obtain the MSBs of the first LTRP. Video decoder 30 may also decode the LSBs of the POC value for the first LTRP and concatenate the MSBs and the LSBs of the POC value for the first LTRP to reproduce the POC value for the LTRP. Video decoder 30 may also decode the LSBs of the POC value for the first LTRP only, when the MSBs are not sent, and can use the LSB values alone to identify the if there are no other reference pictures with the same POC LSB value.

Video decoder 30 may then decode LSBs of a POC value for a next LTRP (202). In the example of FIG. 6, video decoder 30 determines whether LSBs of the POC value for the next LTRP are equal to LSBs of another LTRP for the current picture (204). In other examples, e.g., as explained with respect to Table 1 above, video decoder 30 may determine whether a flag value indicates that MSBs are signaled for the POC value of the next LTRP. In any case, video decoder 30 may determine whether MSBs are signaled for the POC value of the next LTRP. When the MSBs are signaled for the POC value of the next LTRP (e.g., when the LSBs of the POC value for the next LTRP are equal to the LSBs of another reference picture ("YES" branch of 204)), video decoder 30 may decode an MSBs difference value relative to MSBs of a POC value for a previous LTRP (206). That is, video decoder 30 may decode the difference value signaled for LTRP i, and add the difference value to the MSBs of the POC value for LTRP j where LTRP j was the previous LTRP for which the MSB information was decoded. Video decoder 30 may further reassemble the POC value of the next LTRP by concatenating the MSBs (whether calculated or determined implicitly) with the LSBs for the next LTRP.

After determining that the LSBs of the POC value for the next LTRP are not equal to the LSBs of another reference picture ("NO" branch of 204), or after decoding the difference value for the MSBs of the next LTRP, video decoder 30 may determine whether there are more LTRPs for the current picture (210). If there are more LTRPs for the current picture ("YES" branch of 210), video decoder 30 may proceed to decode the POC values for a subsequent LTRP, e.g., as discussed above. Once there are no more LTRPs for the current picture ("NO" branch of 210), video decoder 30 may assemble one or more reference picture lists including the signaled LTRPs (212). Video decoder 30 may then decode the current picture using the reference picture list(s) (214).

For instance, when a block is inter-predicted, the block may include an indication of a reference picture list, and a reference index into the reference picture list, that indicates a reference picture for the block. The block may further include data for reconstructing a motion vector for the block. Thus, video decoder 30 may retrieve a reference block from the reference picture using the motion vector. Video decoder 30 may further decode an error value for the block, e.g., by decoding, inverse quantizing, and inverse transforming transform coefficients for the block. Video decoder 30 may then combine the reference block with a reconstructed residual block to decode the block.

In this manner, the method of FIG. 6 represents an example of a method including decoding a first value representative of a difference between a base most significant bits (MSBs) value of a picture order count (POC) value of a current picture of video data and a first MSBs value of a first POC value of a first long-term reference picture of the video data, decoding a second value representative of a difference between a second MSBs value of a second POC value of a second long-term reference picture of the video data and the first MSBs value, wherein the first POC value and the second POC value have different least significant bits (LSBs) values, and decoding at least a portion of a current picture of the video data relative to at least one of the first long-term reference picture using the first value and the second long-term reference picture using the first value and the second value.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:
   decoding a first value representative of a difference between a base most significant bits (MSBs) value of a picture order count (POC) value of a current picture of video data and a first MSBs value of a first POC value of a first long-term reference picture of the video data;
   decoding a second value representative of a difference between a second MSBs value of a second POC value of a second long-term reference picture of the video data and the first MSBs value, wherein the first POC value and the second POC value have different least significant bits (LSBs) values and the first MSBs value is different than the second MSBs value; and
   decoding at least a portion of a current picture of the video data relative to at least one of the first long-term reference picture using the first value or the second long-term reference picture using the first value and the second value.

2. The method of claim 1, further comprising:
   calculating a first MSB cycle value for the first long-term reference picture as DeltaPocMSBCycleLt using the first value; and
   calculating a second MSB cycle value for the second long-term reference picture as DeltaPocMSBCycleLt, wherein calculating the second MSB cycle value comprises calculating DeltaPocMSBCycleLt based on DeltaPocMSBCycleLt and the second value.

3. The method of claim 1, wherein the first long-term reference picture corresponds to an index of j, wherein the second long-term reference picture corresponds to an index of i, wherein the first value comprises delta_poc_msb_cycle_lt_plus1, wherein the second value comprises delta_poc_msb_cycle_lt_plus1, and wherein j is in the range from 0 to i−1, inclusive.

4. The method of claim 1, wherein at least one of the first value or the second value comprises a negative integer value.

5. The method of claim 1, further comprising determining at least one of the first POC value or the second POC value based at least in part on a number of reference pictures marked as short-term reference pictures for the current picture.

6. A device for decoding video data, the device comprising:
   a memory configured to store video data; and
   a video decoder configured to:
      decode a first value representative of a difference between a base most significant bits (MSBs) value of a picture order count (POC) value of a current picture of the video data and a first MSBs value of a first POC value of a first long-term reference picture of the video data,
      decode a second value representative of a difference between a second MSBs value of a second POC value of a second long-term reference picture of the video data and the first MSBs value, wherein the first POC value and the second POC value have different least significant bits (LSBs) values and the first MSBs value is different than the second MSBs value, and
      decode at least a portion of a current picture of the video data relative to at least one of the first long-term reference picture using the first value or the second long-term reference picture using the first value and the second value.

7. The device of claim 6, wherein the video decoder is further configured to calculate a first MSB cycle value for the first long-term reference picture as DeltaPocMSBCycleLt[i−1] using the first value, and calculate a second MSB cycle value for the second long-term reference picture as DeltaPocMSBCycleLt, wherein calculating the second MSB cycle value comprises calculating DeltaPocMSBCycleLt based on DeltaPocMSBCycleLt and the second value.

8. The device of claim 6, wherein the first long-term reference picture corresponds to an index of i−1, wherein the second long-term reference picture corresponds to an index of i, wherein the first value comprises delta_poc_msb_cycle_lt_plus1, and wherein the second value comprises delta_poc_msb_cycle_lt_plus1.

9. The device of claim 6, wherein at least one of the first value or the second value comprises a negative integer value.

10. The device of claim 6, wherein the video decoder is further configured to determine at least one of the first POC value or the second POC value based at least in part on a number of reference pictures marked as short-term reference pictures for the current picture.

11. A device for decoding video data, the device comprising:
   means for decoding a first value representative of a difference between a base most significant bits (MSBs) value of a picture order count (POC) value of a current picture of video data and a first MSBs value of a first POC value of a first long-term reference picture of the video data;
   means for decoding a second value representative of a difference between a second MSBs value of a second POC value of a second long-term reference picture of the video data and the first MSBs value, wherein the first POC value and the second POC value have different least significant bits (LSBs) values and the first MSBs value is different than the second MSBs value; and
   means for decoding at least a portion of a current picture of the video data relative to at least one of the first long-term reference picture using the first value or the second long-term reference picture using the first value and the second value.

12. The device of claim 11, further comprising:
   means for calculating a first MSB cycle value for the first long-term reference picture as DeltaPocMSBCycleLt using the first value; and
   means for calculating a second MSB cycle value for the second long-term reference picture as DeltaPocMSBCycleLt, wherein calculating the second MSB cycle value comprises calculating DeltaPocMSBCycleLt based on DeltaPocMSBCycleLt and the second value.

13. The device of claim 11, wherein the first long-term reference picture corresponds to an index of j, wherein the second long-term reference picture corresponds to an index of i, wherein the first value comprises delta_poc_msb_cycle_lt_plus1, wherein the second value comprises delta_poc_msb_cycle_lt_plus1, and wherein j is in the range from 0 to i−1, inclusive.

14. The device of claim 11, wherein at least one of the first value or the second value comprises a negative integer value.

15. The device of claim 11, further comprising means for determining at least one of the first POC value or the second POC value based at least in part on a number of reference pictures marked as short-term reference pictures for the current picture.

16. A non-transitory computer-readable storage medium having stored thereon instructions that, when executed, cause a processor to:
decode a first value representative of a difference between a base most significant bits (MSBs) value of a picture order count (POC) value of a current picture of video data and a first MSBs value of a first POC value of a first long-term reference picture of the video data;
decode a second value representative of a difference between a second MSBs value of a second POC value of a second long-term reference picture of the video data and the first MSBs value, wherein the first POC value and the second POC value have different least significant bits (LSBs) values and the first MSBs value is different than the second MSBs value; and
decode at least a portion of a current picture of the video data relative to at least one of the first long-term reference picture using the first value or the second long-term reference picture using the first value and the second value.

17. The non-transitory computer-readable storage medium of claim 16, further comprising instructions that cause the processor to:
calculate a first MSB cycle value for the first long-term reference picture as DeltaPocMSBCycleLt using the first value; and
calculate a second MSB cycle value for the second long-term reference picture as DeltaPocMSBCycleLt, wherein calculating the second MSB cycle value comprises calculating DeltaPocMSBCycleLt based on DeltaPocMSBCycleLt and the second value.

18. The non-transitory computer-readable storage medium of claim 16, wherein the first long-term reference picture corresponds to an index of j, wherein the second long-term reference picture corresponds to an index of i, wherein the first value comprises delta_poc_msb_cycle_lt_plus1, wherein the second value comprises delta_poc_msb_cycle_lt_plus1, and wherein j is in the range from 0 to i−1, inclusive.

19. The non-transitory computer-readable storage medium of claim 16, wherein at least one of the first value or the second value comprises a negative integer value.

20. The non-transitory computer-readable storage medium of claim 16, further comprising instructions that cause the processor to determine at least one of the first POC value or the second POC value based at least in part on a number of reference pictures marked as short-term reference pictures for the current picture.

21. A method of encoding video data, the method comprising:
encoding at least a first portion of a current picture of video data relative to a first long-term reference picture and at least a second portion of the current picture relative to a second long-term reference picture;
encoding a first value representative of a difference between a base most significant bits (MSBs) value of a picture order count (POC) value of a current picture of the video data and a first MSBs value of a first POC value of the first long-term reference picture of the video data; and
encoding a second value representative of a difference between a second MSBs value of a second POC value of the second long-term reference picture of the video data and the first MSBs value, wherein the first POC value and the second POC value have different least significant bits (LSBs) values and the first MSBs value is different than the second MSBs value.

22. The method of claim 21, further comprising:
calculating the first value as a difference between a first MSB cycle value for the first long-term reference picture as DeltaPocMSBCycleLt and the base MSBs value; and
calculating the second value as a difference between a second MSB cycle value for the second long-term reference picture as DeltaPocMSBCycleLt and the first MSBs value.

23. The method of claim 21, wherein the first long-term reference picture corresponds to an index of j, wherein the second long-term reference picture corresponds to an index of i, wherein the first value comprises delta_poc_msb_cycle_lt_plus1, wherein the second value comprises delta_poc_msb_cycle_lt_plus1, and wherein j is in the range from 0 to i−1, inclusive.

24. The method of claim 21, wherein at least one of the first value or the second value comprises a negative integer value.

25. The method of claim 21, wherein encoding the first value and encoding the second value comprises encoding the first value and encoding the second value based at least in part on a number of reference pictures marked as short-term reference pictures for the current picture.

26. A device for encoding video data, the device comprising:
a memory configured to store video data; and
a video encoder configured to:
encode at least a first portion of a current picture of the video data relative to a first long-term reference picture and at least a second portion of the current picture to a second long-term reference picture,
encode a first value representative of a difference between a base most significant bits (MSBs) value of a picture order count (POC) value of a current picture of the video data and a first MSBs value of a first POC value of the first long-term reference picture of the video data, and
encode a second value representative of a difference between a second MSBs value of a second POC value of the second long-term reference picture of the video data and the first MSBs value, wherein the first POC value and the second POC value have different least significant bits (LSBs) values and the first MSBs value is different than the second MSBs value.

27. The device of claim 26, wherein the video encoder is configured to calculate the first value as a difference between a first MSB cycle value for the first long-term reference picture as DeltaPocMSBCycleLt and the base MSBs value, and calculate the second value as a difference between a second MSB cycle value for the second long-term reference picture as DeltaPocMSBCycleLt and the first MSBs value.

28. The device of claim 26, wherein the first long-term reference picture corresponds to an index of j, wherein the second long-term reference picture corresponds to an index of i, wherein the first value comprises delta_poc_msb_cycle_lt_plus1, wherein the second value comprises delta_poc_msb_cycle_lt_plus1, and wherein j is in the range from 0 to i−1, inclusive.

29. The device of claim 26, wherein at least one of the first value or the second value comprises a negative integer value.

30. The device of claim 26, wherein to encode the first value and the second value, the video encoder is configured to encode the first value and the second value based at least in part on a number of reference pictures marked as short-term reference pictures for the current picture.

* * * * *